(12) United States Patent
Hellge et al.

(10) Patent No.: US 11,677,529 B2
(45) Date of Patent: **\*Jun. 13, 2023**

(54) DATA SIGNAL TRANSMISSION IN A WIRELESS COMMUNICATION SYSTEM WITH REDUCED END-TO-END LATENCY

(71) Applicant: Fraunhofer-Gesellschaft zur Foerderung der angewandten Forschung e.V., Munich (DE)

(72) Inventors: Cornelius Hellge, Berlin (DE); Yago Sánchez De La Fuente, Berlin (DE); Thomas Schierl, Berlin (DE); Thomas Haustein, Potsdam (DE); Lars Thiele, Berlin (DE); Thomas Wirth, Kleinmachnow (DE); Martin Kurras, Berlin (DE); Leszek Raschkowski, Berlin (DE); Tatiana Rykova, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 70 days.

This patent is subject to a terminal disclaimer.

(21) Appl. No.: 17/217,444

(22) Filed: Mar. 30, 2021

(65) Prior Publication Data
US 2021/0218536 A1    Jul. 15, 2021

Related U.S. Application Data

(63) Continuation of application No. 16/008,341, filed on Jun. 14, 2018, now Pat. No. 10,979,195, which is a
(Continued)

(51) Int. Cl.
*H04L 5/00* (2006.01)
*H04L 27/26* (2006.01)
(Continued)

(52) U.S. Cl.
CPC .......... *H04L 5/0053* (2013.01); *H04L 5/001* (2013.01); *H04L 5/0048* (2013.01);
(Continued)

(58) Field of Classification Search
CPC ..... H04L 5/0053; H04L 5/001; H04L 5/0064; H04L 5/0048; H04L 16/14; H04L 27/2602
See application file for complete search history.

(56) References Cited

U.S. PATENT DOCUMENTS 8,121,097 B2 *  2/2012  Li ..................... H04L 5/0007
                                              370/347
8,514,820 B2    8/2013  Cai et al.
(Continued)

FOREIGN PATENT DOCUMENTS

CA      2930862 A1    7/2015
CN    101309523 A    11/2008
(Continued)

OTHER PUBLICATIONS

"3GPP TS 36.211", 3GPP TS 36.211, Sec. 6.10.1, Mar. 2018, pp. 133-136.
(Continued)

*Primary Examiner* — Parth Patel
(74) *Attorney, Agent, or Firm* — Perkins Coie LLP; Michael A. Glenn

(57) ABSTRACT

A receiver is configured is configured to receive a data signal, the data signal having at least one data signal block, the data signal block having a predefined duration in the time domain, a number of symbols in the time domain and a bandwidth in the frequency domain, wherein the data signal block is received over a plurality of transmission intervals, wherein a length of one transmission interval is shorter than the duration of the data signal block so that a subset of the
(Continued)

symbols of the data signal block is received over one transmission interval, and wherein the receiver includes a signal processing device configured to process the symbols of the data signal block which have been received over one transmission interval.

12 Claims, 21 Drawing Sheets

Related U.S. Application Data continuation of application No. PCT/EP2015/080659, filed on Dec. 18, 2015.

(51) Int. Cl.
*H04W 16/14* (2009.01)
*H04W 84/04* (2009.01)

(52) U.S. Cl.
CPC ........ *H04L 5/0064* (2013.01); *H04L 27/2602* (2013.01); *H04W 16/14* (2013.01); *H04L 27/2603* (2021.01); *H04W 84/042* (2013.01)

(56) References Cited

U.S. PATENT DOCUMENTS

| | | | |
|---|---|---|---|
| 8,700,388 B2* | 4/2014 | Edler | G10L 19/0212 704/503 |
| 9,380,579 B2* | 6/2016 | Kawasaki | H04L 5/0092 |
| 9,622,099 B2* | 4/2017 | Ezaki | H04W 24/08 |
| 9,717,085 B2* | 7/2017 | Sorrentino | H04L 27/2655 |
| 10,219,232 B2* | 2/2019 | Yu | H04B 7/0617 |
| 10,219,275 B2* | 2/2019 | Kim | H04B 7/2615 |
| 10,225,064 B2* | 3/2019 | Lim | H04L 5/0023 |
| 10,243,639 B2* | 3/2019 | Kim | H04B 7/0456 |
| 10,342,016 B2* | 7/2019 | Futaki | H04W 72/0446 |
| 2010/0034311 A1* | 2/2010 | Hasegawa | H04L 5/0007 375/267 |
| 2012/0014330 A1 | 1/2012 | Damnjanovic et al. | |
| 2012/0044900 A1* | 2/2012 | Morioka | H04B 7/0697 370/310 |
| 2013/0170467 A1* | 7/2013 | Ogawa | H04W 72/04 370/329 |
| 2013/0194981 A1* | 8/2013 | Wang | H04L 5/1469 370/280 |
| 2014/0071954 A1* | 3/2014 | Au | H04W 28/0205 370/336 |
| 2015/0088495 A1* | 3/2015 | Jeong | H04B 11/00 704/205 |
| 2015/0098437 A1* | 4/2015 | Chen | H04L 5/0044 370/330 |
| 2015/0280871 A1* | 10/2015 | Xu | H04J 1/16 370/336 |
| 2015/0333883 A1 | 11/2015 | Liao et al. | |
| 2016/0013920 A1* | 1/2016 | Lyu | H04L 5/0007 370/330 |
| 2016/0128011 A1* | 5/2016 | Yang | H04L 27/2627 370/329 |
| 2016/0135148 A1* | 5/2016 | Novlan | H04L 5/006 370/329 |
| 2016/0143030 A1* | 5/2016 | Lee | H04L 5/0094 370/329 |
| 2016/0149678 A1* | 5/2016 | Akimoto | H04W 72/0446 370/330 |
| 2016/0165398 A1* | 6/2016 | Seo | G01S 11/02 455/456.6 |
| 2016/0219584 A1* | 7/2016 | Bertrand | H04L 5/0044 |
| 2016/0219627 A1* | 7/2016 | Au | H04W 72/04 |
| 2016/0226650 A1* | 8/2016 | Chen | H04L 5/001 |
| 2016/0294521 A1* | 10/2016 | Au | H04L 27/26412 |
| 2016/0309430 A1* | 10/2016 | Chae | H04W 56/0025 |
| 2016/0353436 A1* | 12/2016 | Au | H04L 5/0007 |
| 2016/0353475 A1* | 12/2016 | Au | H04L 5/0042 |
| 2017/0041829 A1 | 2/2017 | Dai et al. | |
| 2017/0041903 A1* | 2/2017 | Ma | H04W 72/04 |
| 2017/0079064 A1* | 3/2017 | Yang | H04W 74/0833 |
| 2017/0135084 A1* | 5/2017 | Kuchibhotla | H04W 72/0406 |
| 2017/0188340 A1* | 6/2017 | Andgart | H04L 27/2602 |
| 2017/0244524 A1* | 8/2017 | Hadani | H04L 27/2636 |
| 2017/0310521 A1* | 10/2017 | Baek | H04L 1/0041 |
| 2017/0318564 A1* | 11/2017 | Lee | H04L 5/0087 |
| 2017/0325227 A1* | 11/2017 | Li | H04W 72/0446 |
| 2018/0035242 A1* | 2/2018 | Yi | H04W 72/044 |
| 2018/0109994 A1* | 4/2018 | Lee | H04W 48/16 |
| 2018/0191545 A1* | 7/2018 | Liu | H04W 74/04 |
| 2018/0205481 A1* | 7/2018 | Shlomo | H04J 11/00 |
| 2018/0242354 A1* | 8/2018 | Takeda | H04W 74/004 |
| 2018/0242389 A1* | 8/2018 | Phuyal | H04W 72/1215 |
| 2018/0255543 A1* | 9/2018 | Takeda | H04W 72/0446 |
| 2018/0310282 A1* | 10/2018 | Shi | H04L 5/0092 |
| 2018/0316468 A1* | 11/2018 | Kishiyama | H04B 7/0617 |
| 2018/0359751 A1* | 12/2018 | Ko | H04W 72/0446 |
| 2018/0367279 A1* | 12/2018 | Hellge | H04L 5/001 |
| 2019/0173599 A1 | 6/2019 | Au et al. | |
| 2019/0173658 A1* | 6/2019 | Fehrenbach | H04L 5/0094 |

FOREIGN PATENT DOCUMENTS

| | | |
|---|---|---|
| CN | 103716274 A | 4/2014 |
| CN | 104620629 A | 5/2015 |
| EP | 2151945 A2 | 2/2010 |
| JP | 2015514346 A | 5/2015 |
| JP | 2017510108 A | 4/2017 |
| JP | 2017516388 A | 6/2017 |
| KR | 20120112629 A | 10/2012 |
| RU | 2462823 C2 | 9/2012 |
| RU | 2519409 C2 | 6/2014 |
| WO | 2007025160 A2 | 3/2007 |
| WO | 2009155764 A1 | 12/2009 |
| WO | 2014040351 A1 | 3/2014 |
| WO | 2014048232 A1 | 4/2014 |
| WO | 2015096821 A1 | 7/2015 |
| WO | 2015148076 A1 | 10/2015 |

OTHER PUBLICATIONS

"Considerations for (E)PDCCH in coverage enhancement", 3GPP TSG RAN WG1 #75, 3GPP (published on Nov. 1, 2013), Nov. 1, 2013.
"Control signaling enhancements for short TTI", 3GPP TSG RAN WG1 #83, 3GPP (published on Nov. 7, 2015), Nov. 7, 2015.
"Scalable bandwidth and UE capability", NEC Group, R1-060058, 3GPP TSG RAN WG1 #AH, 3GPP (published on Jan. 19, 2006), Jan. 19, 2006.
"Study on Lacency Reduction Techniques for LTE", 3rd Generation Partnership Project; Technical Specification Group Radio Access Network; Evolved Universal Terrestrial Radio Access (E-UTRA); (Release 13); 3GPP Draft; R2-157181 36881-050, XP051065267Retrieved from the Internet: URL:http://www.3gpp.org/ftp/tsg_ran/WG2 - RL 2/TSGR2 92/LSout/ [retrieved on Nov. 30, 2015], Nov. 30, 2015.
"System Analysis of TTI Shortening", CATT: 3GPP Draft; R1-156613, 3rd Generation Partnership Project (3GPP); vol. RAN WGI; XP051039895;Retrieved from the Internet: URL:http://www.3gpp.org/ftp/Meetings_3GPP_SYNC/RAN1/Docs/ [retrieved on Nov. 15, 2015], Nov. 15, 2015, pp. 1-8.
3GPP TSG-RAN WG4 Meeting #61, "Multiple RACH procedures for Carrier Aggregation", ZTE: Multiple RACH procedures for Carrier Aggregation, 3GPP Draft; R4-1155963RD Generation Partnership Roject (3GPP) Mobile Competence Centre; 650 Route Des Lucioles; F-06921 Sophia-Antipolis Cedex; France, vol. RAN WG4, No. San Francisco, Nov. 14, 2011-Nov. 18, 2011, Nov. 7, 2011 (Nov. 7, 2011), XP050567048, Nov. 2011, 4 pp.

\* cited by examiner

MasterInformationBlock (current)

```
--ASN1START

MasterInformationBlock ::=         SEQUENCE {
    dl-Bandwidth                       ENUMERATED {
                                           n6, n15, n25, n50, n75, n100},
    phich-Config                       PHICH-Config,
    systemFrameNumber                  BIT STRING (SIZE (8)),
    spare                              BIT STRING (SIZE (10))
}

--ASN1STOP
```
↳ 134

Fig. 9A

MasterInformationBlock (modified)

```
--ASN1START

MasterInformationBlock ::=         SEQUENCE {
    dl-Bandwidth                       ENUMERATED {
                                           n6, n15, n25, n50, n75, n100},
    phich-Config                       PHICH-Config,
    systemFrameNumber                  BIT STRING (SIZE (8)),
    reduced_tti_config                 ENUMERATED {
                                           n1, n2, n7, n14,
    spare                              BIT STRING (SIZE (8))
}

--ASN1STOP
```
↳ 136, 138

Fig. 9B

MasterInformationBlock (modified)

--ASN1START

```
MasterInformationBlock ::=      SEQUENCE {
    dl-Bandwidth                ENUMERATED {
                                    n6, n15, n25, n50, n75, n100},
    phich-Config                PHICH-Config,
    systemFrameNumber           BIT STRING (SIZE (8)),              138
    reduced_tti_config          ENUMERATED {
                                    n1, n2, n7, n14,
    red_tti_Bandwidth           ENUMERATED {
                                    n1, n2, n4, n8, n16, n32},
    spare                       BIT STRING (SIZE (6))
}
                                                                    142
                                            140
```

--ASN1STOP

Fig. 10

MasterInformationBlock (modified)

--ASN1START

```
MasterInformationBlock ::=      SEQUENCE {
    dl-Bandwidth                ENUMERATED {
                                    n6, n15, n25, n50, n75, n100},
    phich-Config                PHICH-Config,
    systemFrameNumber           BIT STRING (SIZE (8)),
    reduced_tti_config_used     BOOL,
    spare                       BIT STRING (SIZE (9))
}
                                                                    146
                                            144
```

--ASN1STOP

Fig. 11

RRCConnectionSetup message

--ASN1START

```
RRCConnectionSetup ::=            SEQUENCE {
    rrc-TransactionIdentifier         RRC-TransactionIdentifier,
    criticalExtensions                CHOICE {
        c1                                CHOICE {
            rrcConnectionSetup-r8             RRCConnectionSetup-r8-IEs,
            spare7 NULL,
            spare6 NULL, spare5 NULL, spare4 NULL,
            spare3 NULL, spare2 NULL, spare1 NULL
        },
        criticalExtensionsFuture          SEQUENCE {}
    }
}

RRCConnectionSetup-r8-IEs ::=     SEQUENCE {
    radioResourceConfigDedicated      RadioResourceConfigDedicated,
    nonCriticalExtension              RRCConnectionSetup-v8a0-IEs    OPTIONAL
}

RRCConnectionSetup-v8a0-IEs ::=   SEQUENCE {
    lateNonCriticalExtension          OCTET STRING                   OPTIONAL,
    nonCriticalExtension              SEQUENCE {}                    OPTIONAL
}
```

--ASN1STOP

Fig. 12

DATA SIGNAL TRANSMISSION IN A WIRELESS COMMUNICATION SYSTEM WITH REDUCED END-TO-END LATENCY

CROSS-REFERENCE TO RELATED APPLICATIONS

This application is a continuation of U.S. application Ser. No. 16/008,341, filed Jun. 14, 2018, which is incorporated herein by reference in its entirety, which in turn is a continuation of International Application No. PCT/EP2015/080659, filed Dec. 18, 2015, which is also incorporated herein by reference in its entirety.

The present invention concerns the field of wireless communication systems, for example wireless mobile communication systems, in which data is transmitted from a transmitter to one or more receivers, like mobile terminals, wherein the transmitters may be base stations of the wireless communication system or other mobile terminals. Embodiments of the invention concern the transmission of data in such a system with a reduced end-to-end latency. Embodiments of the invention provide a constant bit rate and flexible length subframe approach for multicarrier access systems.

BACKGROUND OF THE INVENTION

FIG. 1 shows a schematic representation of an example of a wireless communication system including a plurality of base stations $eNB_1$ to $eNB_5$, each serving a specific area surrounding the base station schematically represented by the respective cells $100_1$ to $100_5$. The base stations are provided to serve mobile terminals that are present within a cell. FIG. 1 shows an exemplary view of only five cells, however, the wireless communication system may include more such cells. FIG. 1 shows two mobile terminals $UE_1$ and $UE_2$ that are in cell $100_2$ and that are served by base station $eNB_2$. The arrows $102_1$, $102_2$ schematically represent uplink/downlink channels for transmitting data from a mobile terminal $UE_1$, $UE_2$ to the base stations $eNB_2$ or for transmitting data from the base station $eNB_2$ to the mobile terminal $UE_1$, $UE_2$, respectively. The wireless communication system may be an orthogonal frequency-division multiplexing (OFDM) system or an orthogonal frequency-division multiple access (OFDMA) system, as it is, for example, used by the LTE standard or other multicarrier systems based on frequency-division multiplexing. In the current LTE standard, a transmission time interval (TTI) is defined as having a length 1 ms, and the TTI is the granularity at which the data may be mapped from higher layers to the physical layer (PHY) to perform the transmission. The mobile terminal processes the data that it receives with a granularity of 1 ms. The UE needs to be synchronized to the radio network and to pass the control information each millisecond to see whether some data has been sent to it, and, in an affirmative case, the mobile terminal has to decode the data channel which has a length of 1 ms.

An OFDMA system for data transmission makes use of an OFDMA-based physical resource grid which comprises a set of resource elements to which various physical channels and physical signals are mapped. For example, in accordance with the LTE standard, the physical channels may include the physical downlink shared channel (PDSCH) carrying user specific data, also referred to as downlink payload data, the physical broadcast channel (PBCH) carrying for example the master information block, the physical downlink control channel (PDCCH) carrying for example the downlink control information (DCI), etc. The physical signals may comprise reference signals (RS), synchronization signals and the like. The LTE resource grid comprises a 10 ms frame in the time domain having a given bandwidth in the frequency domain. The frame has 10 subframes of 1 ms length, and each subframe includes two slots of 6 or 7 OFDM symbols depending on the cyclic prefix (CP) length.

FIG. 2 shows an exemplary OFDMA-subframe 104 for two antennas ports as it may be used for an LTE downlink communication. The depicted subframe includes two resource blocks (RB) each made up of one slot of the subframe and 12 subcarriers in the frequency domain. The subcarriers in the frequency domain are shown as subcarrier 0 to subcarrier 11, and in the time domain, each slot includes OFDM symbols 0 to 6. A resource element is made up of one symbol in the time domain and one subcarrier in the frequency domain. The white boxes 106 represent resource elements allocated to the PDSCH, carrying the payload or user data. The resource elements for the physical control channels (carrying non-payload or non-user data) are represented by the hatched boxes 108. In accordance with examples, resource elements may be allocated to the PDCCH, to the physical control format indicator channel (PCFICH), and to the physical hybrid ARQ indicator channel (PHICH). The cross-hatched boxes 110 represent resource elements which are allocated to the RS that may be used for the channel estimation. The black boxes 112 represent unused resources in the current antenna port that may correspond to RSs in another antenna port.

The resource elements 108, 110, 112 allocated to the physical control channels and to the physical reference signals are not evenly distributed over time. More specifically, in slot 0 of the subframe 104 all resource elements associated with the symbol 0 are allocated to the physical control channels or to the physical reference signals. The resource elements associated with symbol 4 in slot 0 as well as the resource elements associated with symbols 0 and 4 in slot 1 of the subframe are allocated in part to the physical control channels or to the physical reference signals. The white resource elements shown in FIG. 2 may carry symbols associated with payload data or user data and in the slot 0 for symbols 1, 2, 3, 5 and 6, 12 resource elements 106 are allocated to payload data, while only 8 resource elements 106 are allocated to payload data in symbol 4 of slot 0, and no resource element is allocated to payload data in symbol 0. In slot 1 the resource elements associated with symbols 1, 2, 3, 5 and 6 are all allocated to payload data, while for symbols 0 and 4 only 8 resource elements are allocated to payload data.

The duration of the subframe 104 is 1 ms, and in accordance with the LTE standard, the TTI is 1 ms. When transmitting data using the resource grid structure shown in FIG. 2, the receiver, for example the mobile terminal or mobile user, receives the resource elements depicted in FIG. 2 in 1 ms. The information contained or defined by the resource elements may be processed, and for each transmission, i.e. for each TTI having the 1 ms length, a constant number of payload data is received. The transmission scheme leads to an end-to-end latency of more than 1 ms, as the receiver first receives a transmission having a duration of 1 ms and then, once the transmission is completed, processes the control information to see whether some data has been sent to the receiver, and in case it is true, the receiver decodes the data channel of a length of 1 ms. Thus, the duration of the transmission and the processing time add up to a period exceeding 1 ms.

SUMMARY

An embodiment may have a receiver, wherein the receiver is configured to receive a data signal, the data signal having a plurality of frames, the plurality of frames having at least a first frame received in one frequency band and a second frame received in another frequency band, wherein the first frame is different from a legacy LTE frame and the second frame is different from a legacy LTE frame, wherein the first frame has a first format with a predefined duration in the time domain, a number of symbols in the time domain and a bandwidth in the frequency domain, wherein the second frame has a second format with a predefined duration in the time domain, a number of symbols in the time domain and a bandwidth in the frequency domain, the first format and the second format being different, wherein the receiver has a signal processing device configured to process the symbols of the frames having the first format and the second format, wherein the receiver is configured to use the first frame as an access point to synchronize and to discover where to find the other frequency band for the second frame, and wherein, responsive to a signaling that indicates that the other frequency band for the second frame is to be processed, the receiver is configured to not process the frequency band for the first frame and to decode the other frequency band for the second frame.

Another embodiment may have a receiver, wherein the receiver is configured to receive a data signal, the data signal having at least one data signal block, the data signal block having a predefined duration in the time domain, a number of symbols in the time domain and a bandwidth in the frequency domain, wherein the receiver has a signal processing device configured to process the symbols of the data signal block which have been received, and wherein the receiver is to receive a signaling of information what symbols are used for control information, the control information determining whether data is assigned to the receiver for eventually decoding the data.

Another embodiment may have a transmitter, wherein the transmitter is configured to transmit a data signal, the data signal having a plurality of frames, the plurality of frames having at least a first frame transmitted in one frequency band and a second frame transmitted in another frequency band, wherein the first frame is different from a legacy LTE frame and the second frame is different from a legacy LTE frame, wherein the first frame has a first format with a predefined duration in the time domain, a number of symbols in the time domain and a bandwidth in the frequency domain, wherein the second frame has a second format with a predefined duration in the time domain, a number of symbols in the time domain and a bandwidth in the frequency domain, the first format and the second format being different at least in terms of the duration in the time domain or the bandwidth in the frequency domain, wherein a receiver is to use the first frame as an access point to synchronize and to discover where to find the other frequency band for the second frame, and wherein, responsive to a signaling that indicates that the other frequency band for the second frame is to be processed, the receiver is to not process the frequency band for the first frame and to decode the other frequency band for the second frame.

Still another embodiment may have a transmitter, wherein the transmitter is configured to transmit a data signal, the data signal having at least one data signal block, the data signal block having a predefined duration in the time domain, a number of symbols in the time domain and a bandwidth in the frequency domain, and wherein the transmitter is configured to signal to a receiver information what symbols are used for control information, the control information determining whether data is assigned to the receiver for eventually decoding the data.

According to another embodiment a method may have the steps of: receiving, at a receiver, a data signal, the data signal having a plurality of frames, the plurality of frames having at least a first frame received in one frequency band and a second frame received in another frequency band, wherein the first frame is different from a legacy LTE frame and the second frame is different from a legacy LTE frame, wherein the first frame has a first format with a predefined duration in the time domain, a number of symbols in the time domain and a bandwidth in the frequency domain, and wherein the second frame has a second format with a predefined duration in the time domain, a number of symbols in the time domain and a bandwidth in the frequency domain, the first format and the second format being different at least in terms of the duration in the time domain or the bandwidth in the frequency domain; and processing, by the receiver, the symbols of the frames having the first format and the second format, wherein the first frame is used by the receiver as an access point to synchronize and to discover where to find the other frequency band for the second frame, and wherein, responsive to a signaling that indicates that the other frequency band for the second frame is to be processed, the receiver does not process the frequency band for the first frame and to decode the other frequency band for the second frame.

According to still another embodiment, a method may have the steps of: receiving, by a receiver, a data signal, the data signal having at least one data signal block, the data signal block having a predefined duration in the time domain, a number of symbols in the time domain and a bandwidth in the frequency domain, wherein a symbol and a frequency define a resource element of the data signal block, the data signal block having control data and payload data, and receiving, by the receiver, a signaling of information what symbols are used for control information, the control information determining whether data is assigned to the receiver for eventually decoding the data.

BRIEF DESCRIPTION OF THE DRAWINGS

Embodiments of the present invention will be detailed subsequently referring to the appended drawings, in which:

FIG. 4a-b shows an LTE OFDMA based CBR subframe in accordance with another embodiment of the present invention assuming two antenna ports for different selected transmit antenna ports, wherein FIG. 4A shows the subframe as used at the first antenna port, and FIG. 4B shows the subframe structure as used at the second antenna port;

FIG. 5a-d shows an embodiment of the LTE OFDMA based CBR subframe structure in accordance with yet another embodiment of the present invention assuming four antenna ports for different selected transmitter antenna ports, wherein FIGS. 5A to 5D show the respective CBR subframes as used when transmitting on transmitter antenna port 1, 2, 3 and 4, respectively;

FIG. 9a-b shows an embodiment for implementing a signaling of the reduced TTI to a receiver in accordance with an embodiment of the present invention, wherein FIG. 9A indicates a master information block (MIB) as it is used in conventional approaches, and FIG. 9B shows a modified MIB including the additional information in accordance with the inventive approach;

FIG. 10 shows a further embodiment for a modified MIB allowing the static configuration to be applied to a smaller part of the bandwidth of the system;

FIG. 11 shows an embodiment for yet another modified MIB;

FIG. 12 shows an radio resource control (RRC) connection setup message in which the "late noncritical extension" may be used to signal that the DCI format used contains information about the TTI assignment;

DETAILED DESCRIPTION OF THE INVENTION

In the following, embodiments of the present invention are described in further detail with reference to the enclosed drawings in which elements having the same or similar function are referenced by the same reference signs.

Figure 1:
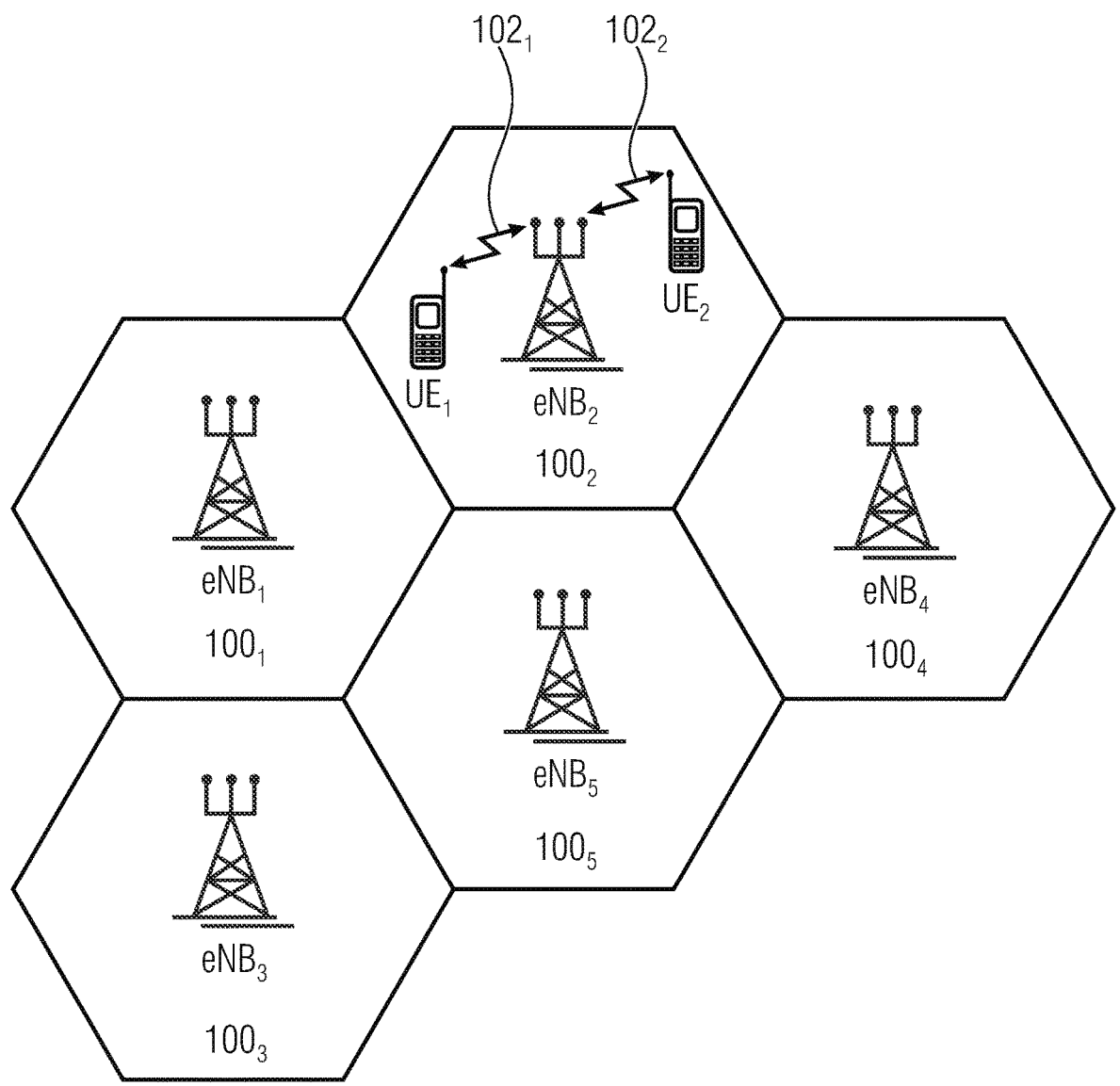
FIG. 1 shows a schematic representation of an example of a wireless communication system including a plurality of base stations.
Figure 2:
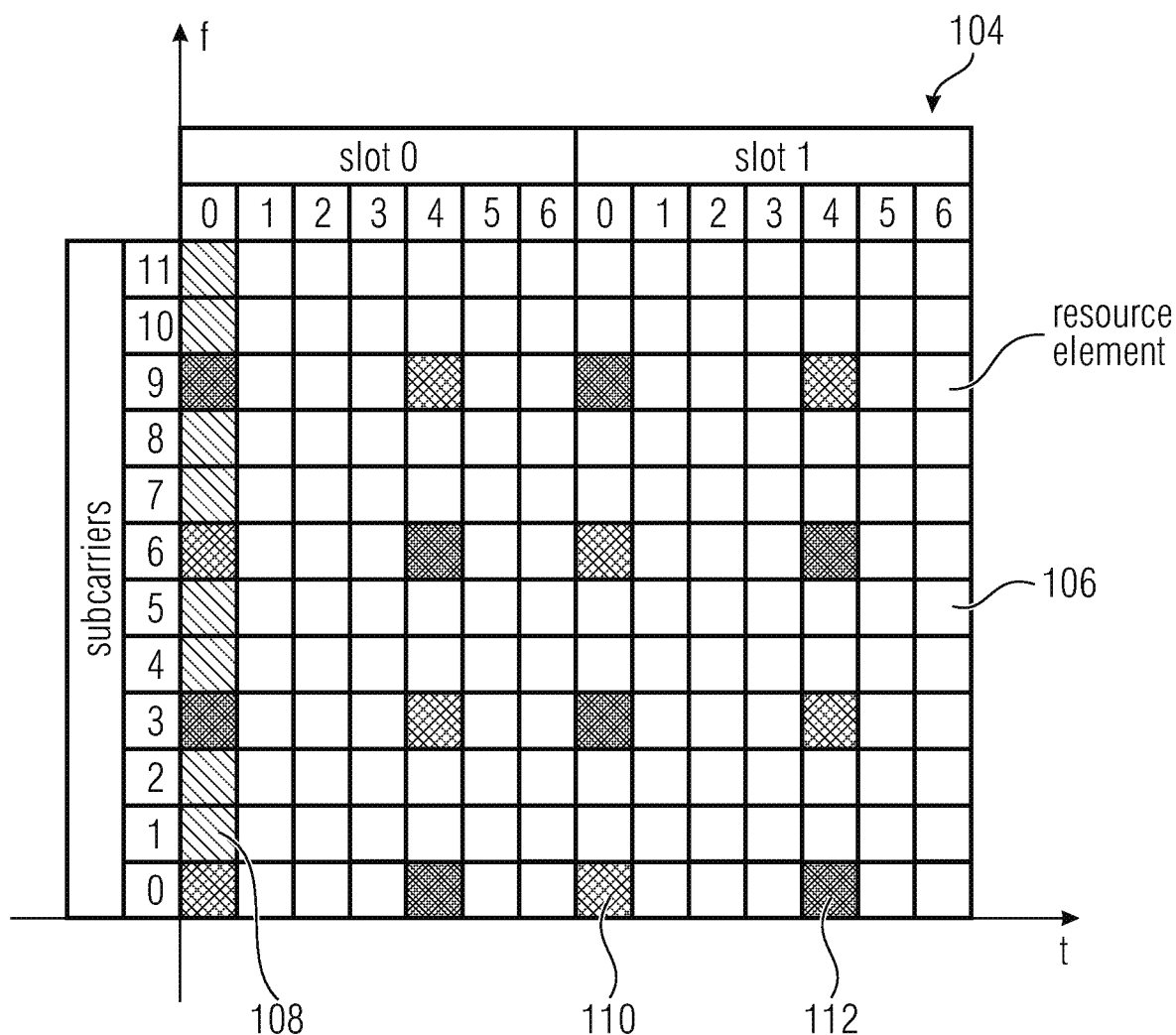
FIG. 2 shows an exemplary OFDMA-subframe for two antennas ports as it may be used for a conventional LTE downlink communication.

A data transmission in a wireless communication system, like an OFDMA system as depicted in FIG. 1, may use a resource grid structure as shown in FIG. 2. The TTI, also referred to as transmission interval, is selected to be 1 ms which is the duration of the subframe, also referred to as data signal block. A receiver, like a mobile user, processes the data with a granularity of 1 ms, i.e. each millisecond the receiver synchronizes with the radio network and processes the control information. In case processing the control information shows that data is designated for the receiver, a 1 ms duration of the data channel is decoded. There may be situations, for example extreme real-time communication use cases, like ultra-low delay (ULD) services, where an end-to-end latency needs to be reduced to 1 ms or less. When the receiver processes the data with a granularity of 1 ms, a reduction of the end-to-end latency is not achievable. For a latency reduction to 1 ms or less, the TTI may be shortened, and the reduction of the TTI length may bring significant benefits in terms of throughput increase, for example in file transfer protocol (FTP)/transmission control protocol (TCP) transmissions in slow start mode and may also lead to a faster processing at the application layer.

In accordance with a first aspect of the present invention, the reduction of the TTI is provided together with a modified format of the subframe for ensuring a constant throughput of user data or payload data irrespective of the actual length of the TTI. The TTI may be reduced from the conventional length of 1 ms covering 14 symbols (with normal CP) in a subframe to as low as 1 symbol, so that instead of conventionally using a single TTI of 1 ms, 14 TTIs of 1 symbol length are applied. In accordance with the first aspect the conventional subframe format is modified in such a way that irrespective of the TTI used the payload throughput remains constant.

In accordance with a second aspect, frames or subframes of different format may be received at a receiver, e.g. one or more first frames or subframes (also referred to as data signal blocks) having a first format (also referred to as block structure) with a predefined duration in the time domain, a number of symbols in the time domain and a bandwidth in the frequency domain, and one or more second frames or subframes having a second format (different from the first format) with a predefined duration in the time domain, a number of symbols in the time domain and a bandwidth in the frequency domain. The receiver processes the symbols of the frames or subframes having the first and second formats.

The different frames or subframes may be received consecutively or at the same time, e.g., by using Carrier Aggregation (CA).

For example, the first frame or subframe may be a LTE frame or subframe, i.e., a frame or subframe having a format or structure in accordance with the LTE standard so that resource elements are allocated to the control channels, the reference signals and the payload as defined by the LTE standard. The second frame or subframe may be an ULD subframe in accordance with the further aspects described herein. The ULD subframe of the aspects described herein is an example of a frame different to a legacy LTE frame structure that allows the users to achieve constant bit rate over reduced TTI transmissions in a backward compatible manner by using carrier aggregation technique. In accordance with further embodiments other frame structures patterns may be aggregated with the conventional LTE radio frame structure while preserving the bandwidth size. For example, the radio frames having the format/structure different from the LTE standard may have a similar OFDM symbol configuration but a different placement of control and reference signals data elements (resource elements) when compared to the LTE standard.

In accordance with a third aspect, the format of the subframe remains substantially the same, and the receiver starts processing of the received symbols earlier than in conventional approaches, i.e. the receiver processes the data with a reduced granularity corresponding to a reduced TTI. In other words, the decoded data channel length is shorter than the length or duration of the subframe. A reduction of the end-to-end latency is achieved due to the earlier start of the processing at the receiver side. In accordance with embodiments, an additional signaling is provided to the receiver to inform the receiver about the actual TTI length. This allows the receiver to start processing of the received symbols earlier, i.e. once the receiver is aware of the fact that the TTI is less than the duration of the subframe the receiver may start processing the data already received with a reduced granularity corresponding to the reduced TTI.

In the following, the inventive aspects are described in further detail, however, it is noted that the all aspects may also be combined and used together, for example for signaling to the receiver, in case of using a subframe being send using together with a standard frame (second aspect), e.g., using carrier aggregation, having the inventive format (first aspect), which of the resource blocks in a subframe use the inventive subframe format and what the actual TTI is (third aspect).

First Aspect—Subframe Format

In accordance with the first aspect of the present invention, the reduction of the TTI goes together with a modification of the subframe format when compared to the format described above with reference to FIG. 2 so as to maintain a constant payload data or user data throughput irrespective of the actual TTI used.

When considering the conventional subframe structure transmitting a frame of a data signal including a plurality of the subframes, each subframe has substantially the same number of resource elements associated with payload data, as the TTI corresponds to the length of the subframe. When considering for example ULD services, for example ULD video, ULD machine-type communications (MTC), the time transmission interval TTI may be reduced for example to be equal to 1 OFDM symbol. In other words, when considering FIG. 2 and a TTI of 1 OFDM symbol, during the first TTI no user data is transmitted as all the resource elements associated with symbol 0 in slot 0 of the subframe are either unused (see blocks 112) or are allocated to control information or references signals (see blocks 108, 110). During each of the subsequent three TTIs, 12 resource elements 106 allocated to user data are transmitted, during the fifth TTI 8 resource elements 106 allocated to user data are transmitted, and during the sixth and seventh TTI again 12 resource elements 106 allocated to user data are transmitted. In slot 1 of the subframe 104, the number of resource elements 106 allocated to user data varies from the seventh to fourteenth TTI to be 8, 12, 12, 12, 8, 12, 12 resource elements, i.e. the data rate per TTI is not constant. This may force ULD surfaces to adapt to the available data rate which is not optimal for such services which rely on a constant data rate.

Figure 3:
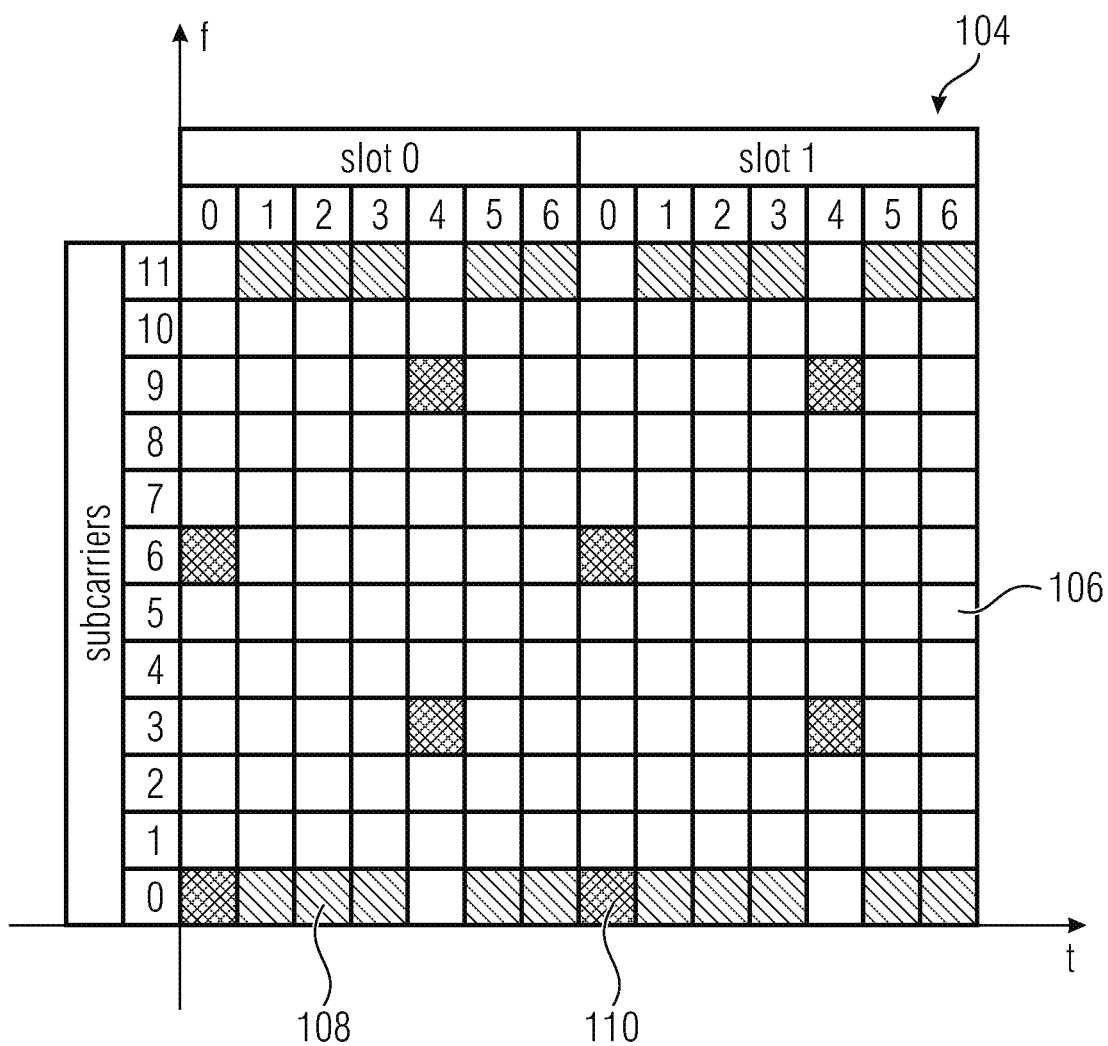
FIG. 3 shows an LTE OFDMA based CBR subframe for one antenna port in accordance with embodiments of the present invention.

FIGS. 3, 4 and 5 show embodiments of the first aspect of the present invention mapping in a subframe the resource elements allocated to the reference signals and to the control information in such a way that a constant data throughput or constant bit rate (CBR) is provided irrespective of the TTI length that is used in a multicarrier OFDMA transmission system. The control data for the physical control channels and the physical signals are mapped to the resource elements in such a way that for each symbol the number of resource elements 106 to which payload data is mapped remains constant, or is the same for each symbol in the subframe 104. FIG. 3 shows an embodiment of an LTE OFDMA based CBR subframe 104 assuming one antenna port so that there is no unused resource element. When compared to FIG. 2, in accordance with the inventive approach, the mapping of the resource elements 108, 110 allocated to the reference signals and the control information is evenly distributed over the time domain. For each symbol the number of resource elements 106 allocated to user-data or payload data is the same or constant. In the embodiment depicted in FIG. 3, for each symbol in the subframe two resource elements are allocated to the control information, except for those symbols in which resource elements are allocated to the reference signals. The resource elements allocated to control information are associated with the first or twelfth subcarrier, however, in accordance with other embodiments the control data resource elements 108, 110 may be associated to the subcarriers in a different way, provided the number of payload resource elements 106 remains the same or constant for each symbol in the subframe. In accordance with other embodiments, more control information resource elements 108 or less control information resource elements 108 may be provided, and likewise also the position of physical signal resource elements 110 may be changed and/or the number of physical signal resource elements 110 may be increased or reduced.

In accordance with the inventive approach the RS resource elements 110 are more evenly distributed over the duration of the subframe and are equally spaced over time and frequency so as to ensure the same channel estimation capability for time varying channels as when using the conventional subframe structure. The control information resource elements 108, for example for PDCCH, PCFICH, and PHICH, when compared to the conventional case, are more evenly distributed over the duration of the subframe in the time domain which allows to preserve the CBR. The resource elements 108 for the control information are interleaved in the frequency domain, thereby taking advantage of the frequency diversity. In accordance with other embodiments, for example in highly loaded network scenarios, the control data may be mapped to additional resource elements that are also equally distributed among the OFDM symbols and the time domain, so that the number of payload resource elements per OFDM symbol remains the same or constant.

When considering a TTI having a length shorter than the subframe length of the subframe of FIG. 3, for example a length of less than 14 OFDM symbols, irrespective of the actual number of OFDM symbols covered by the TTI, the number of resource elements 106 associated with payload data per TTI is the same or constant, thereby providing for a constant data throughput irrespective of changes in the TTI, making the inventive subframe structure especially suitable for ULD services for which a reduced end-to-end latency is desired (achieved by the reduced TTI and the earlier start of the data processing) and which involve, for optimal performance, a constant data rate (achieved by the inventive subframe structure).

In the above description of FIG. 3 references have been made to a subframe of a data signal including 12 subcarriers in the frequency domain and the two slots of 7 symbols in the time domain. It is noted that the actual data signal may include a plurality of frames, each including a predefined number of subframes, e.g. 10 subframes in case of the LTE standard. Each subframe may include more than 12 subcarriers, e.g. up to 1200 subcarriers for a LTE subframe in a system having a bandwidth of 20 MHz. A resource block RB of the data signal may be made up of one slot of the subframe and 12 subcarriers in the frequency domain so that a subframe may include a plurality of resource blocks. FIG. 3 shows an embodiment of two resource blocks of a subframe.

Figure 4A:
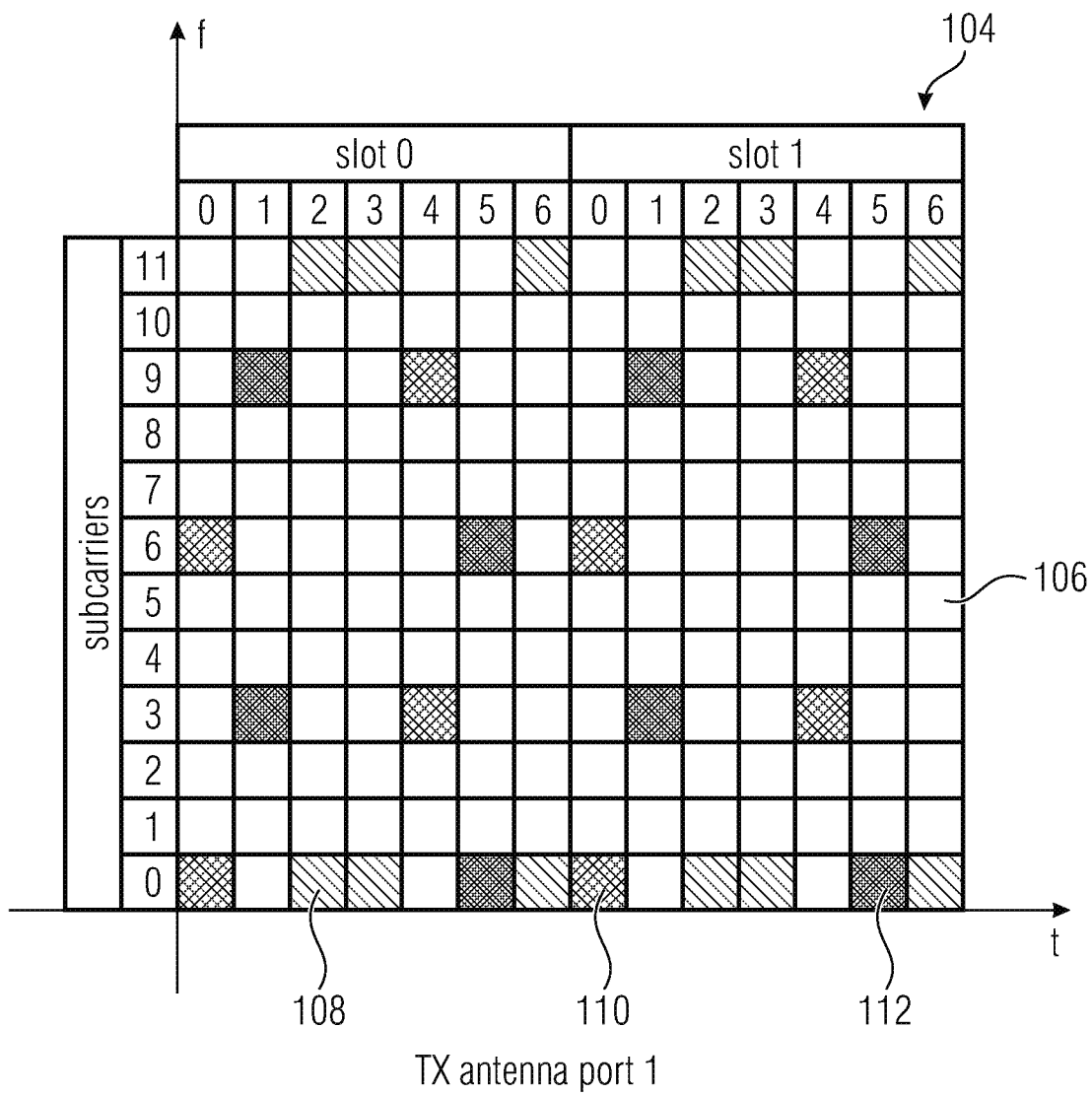
Figure 4B:
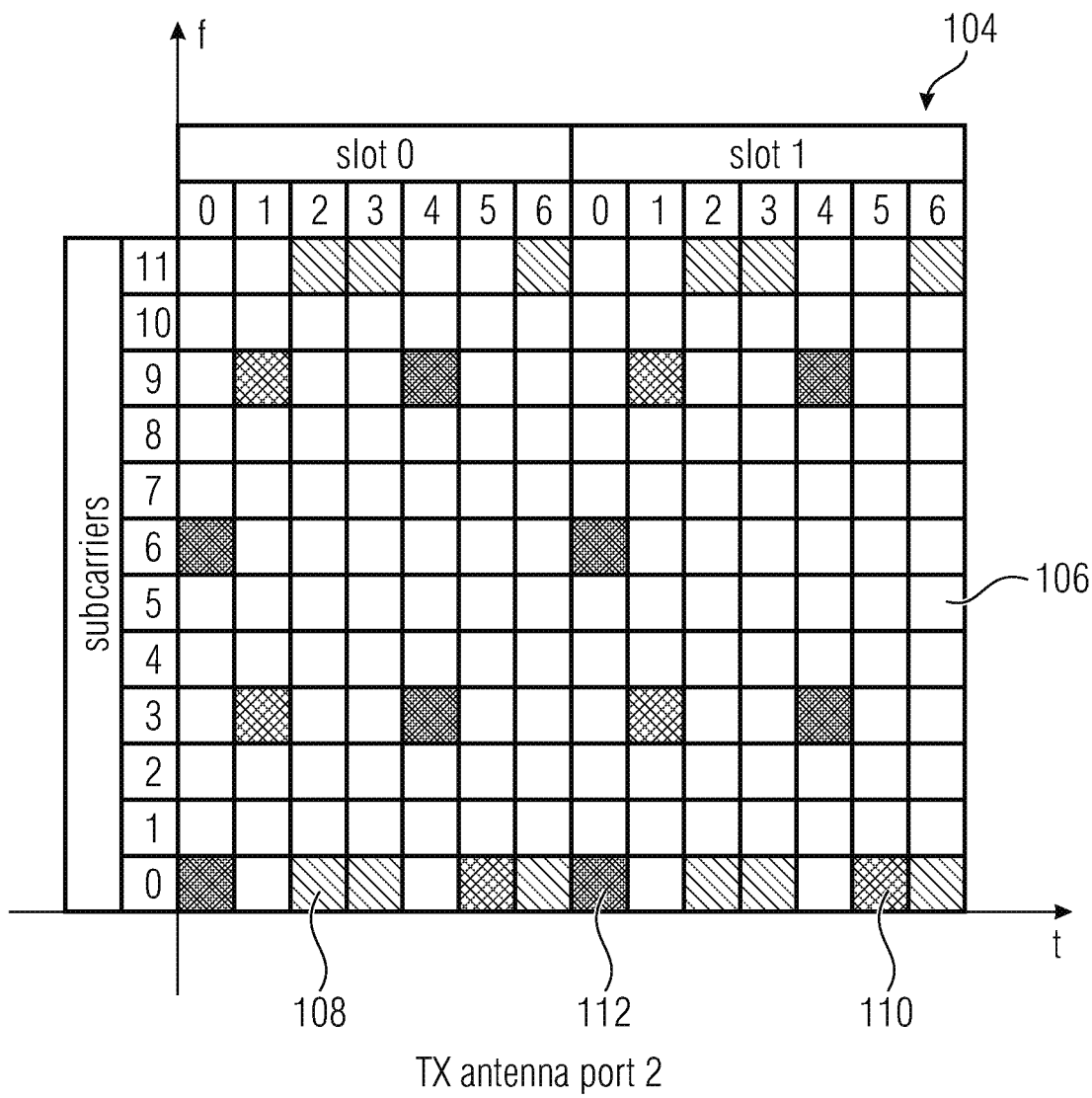
Figure 5A:
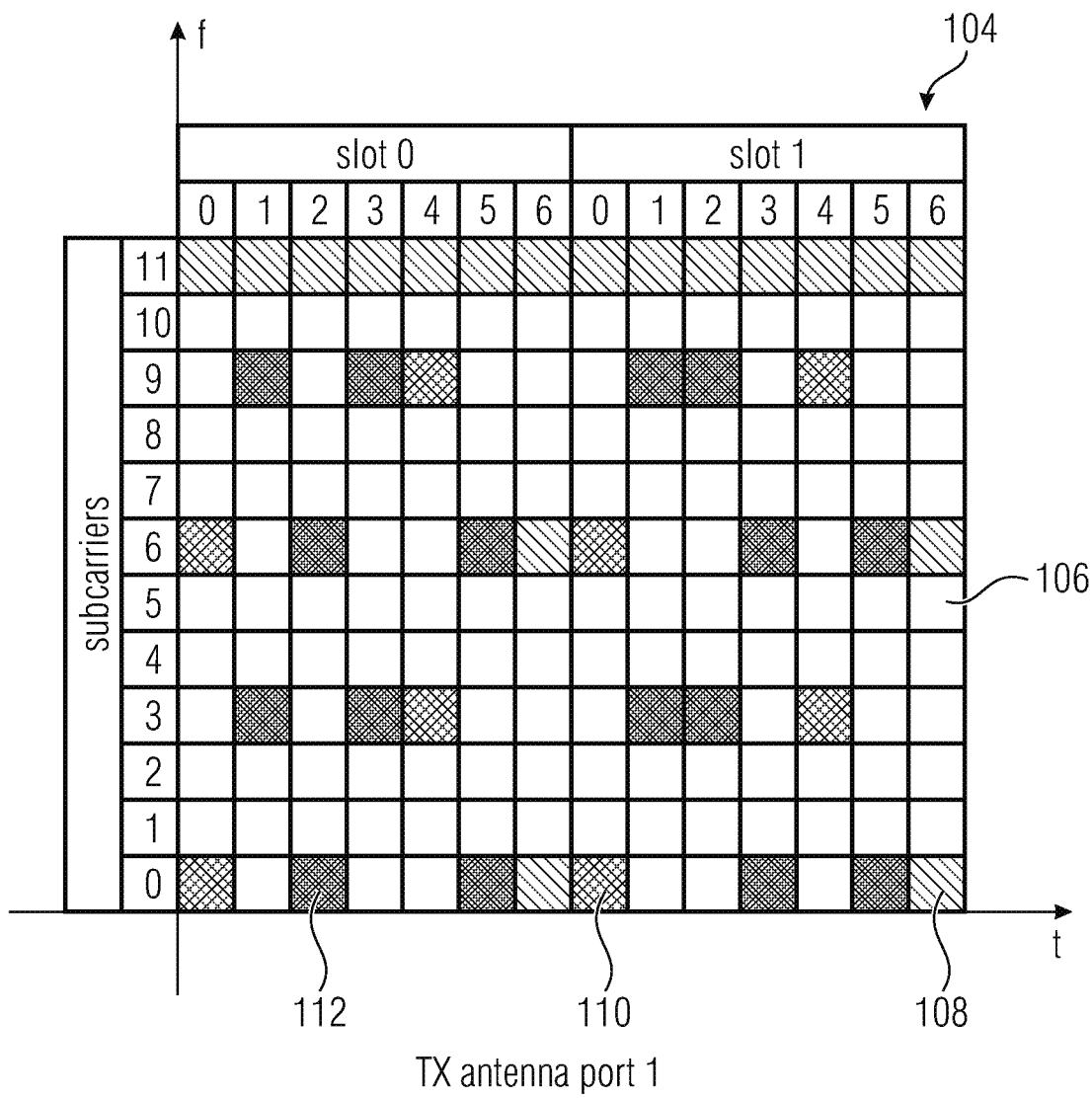
Figure 5B:
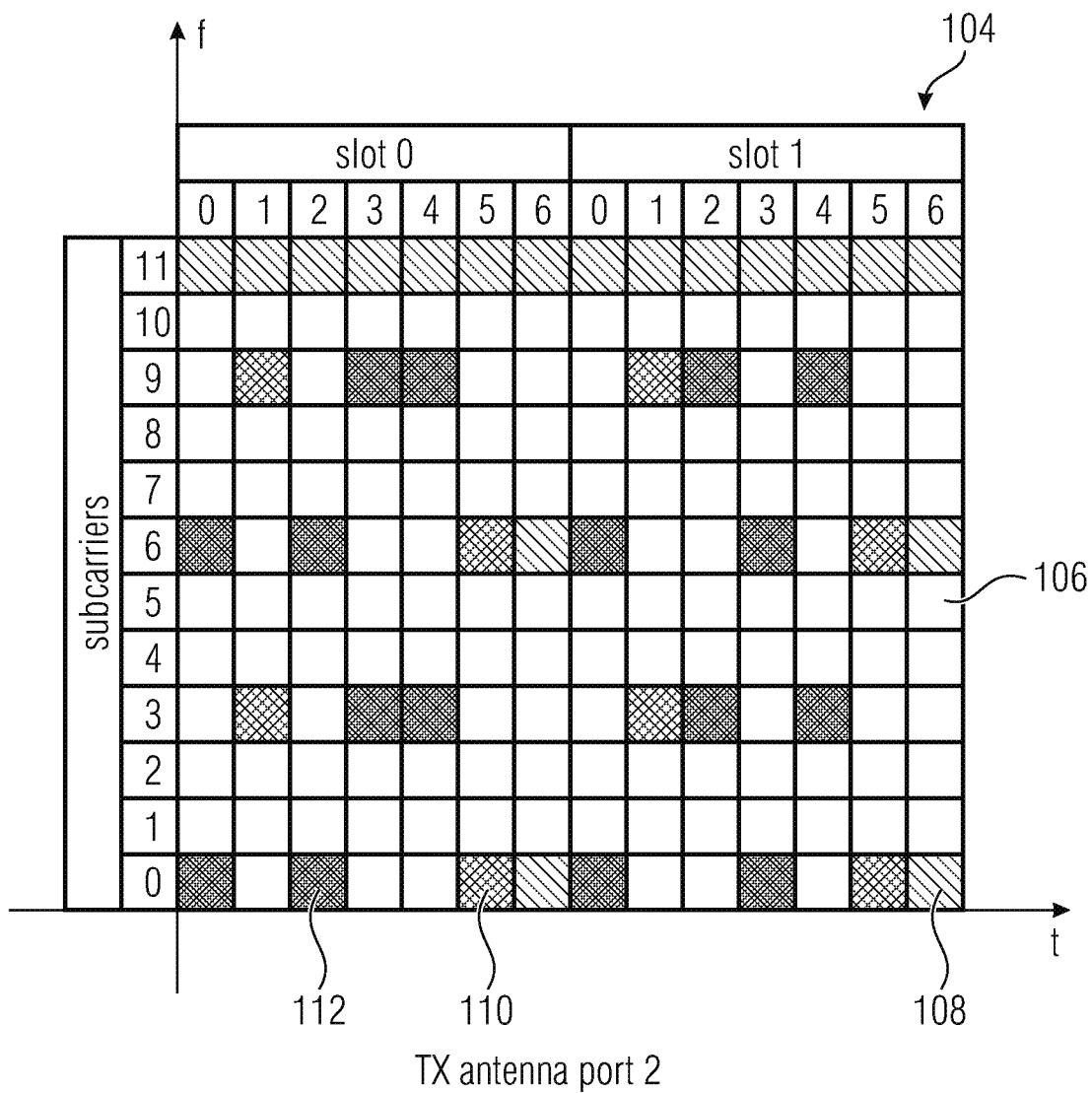
Figure 5C:
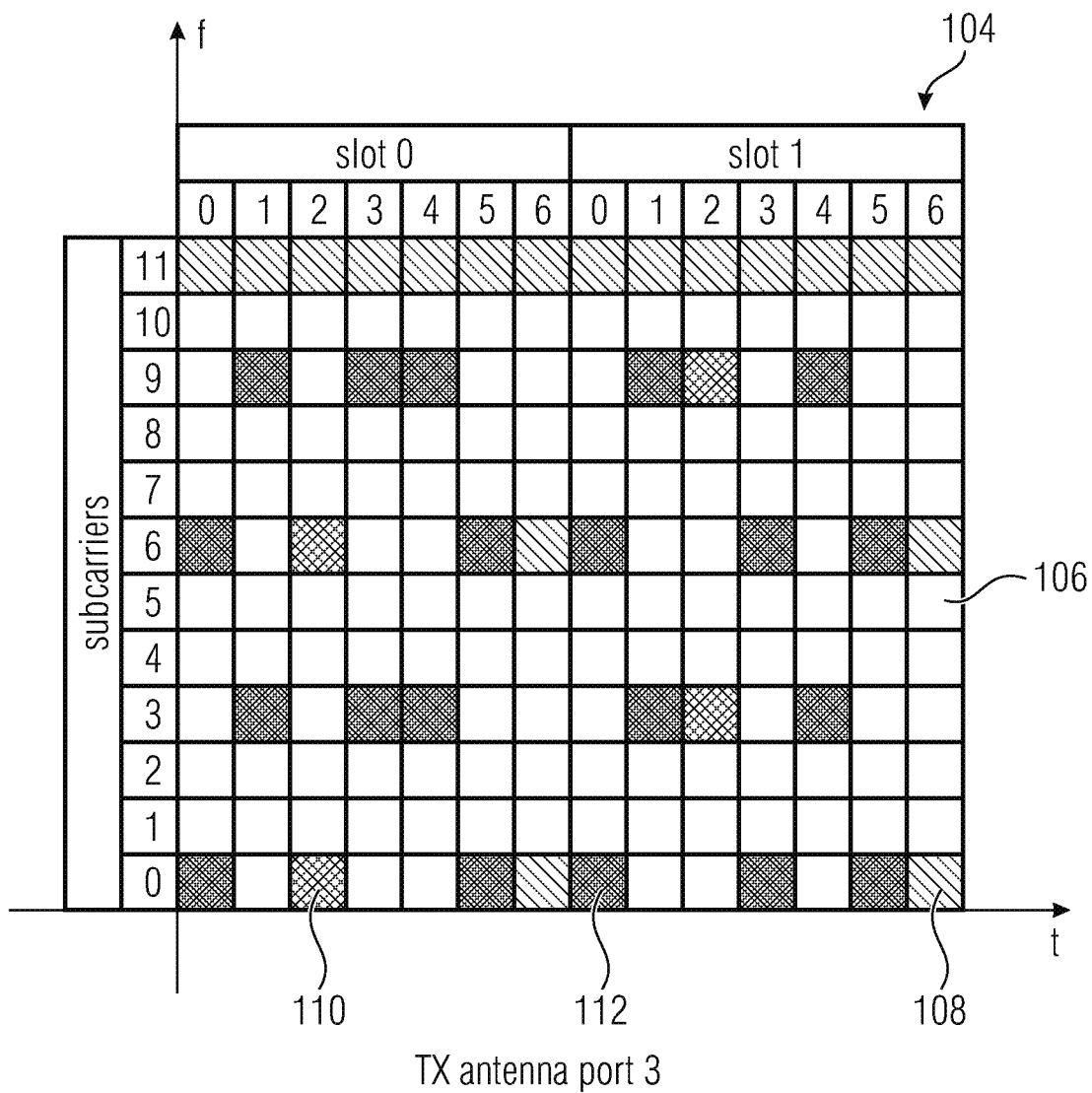
Figure 5D:
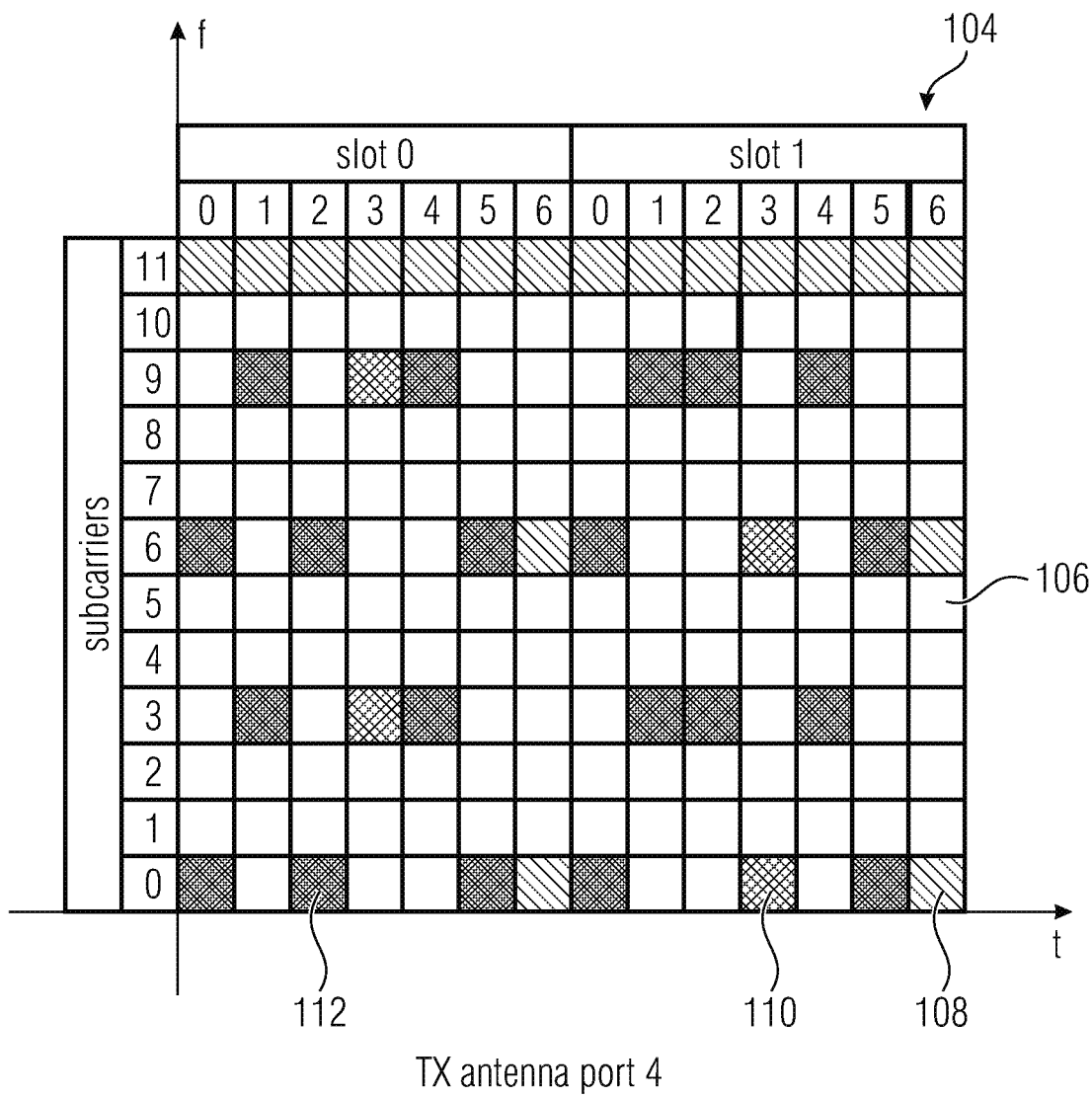

FIG. 4 shows an LTE OFDMA based CBR subframe in accordance with another embodiment of the present invention assuming two antenna ports for different selected transmit antenna ports. FIG. 4A shows the subframe as used at the first antenna port, and FIG. 4B shows the subframe structure as used at the second antenna port. When compared to FIG. 3, the subframes depicted in FIG. 4A and FIG. 4B include the additional black boxes 112 indicating resource elements that are not used in the current antenna port. These resource elements 112 correspond to resource elements used for reference signals in the other antenna port. For each symbol the number of payload data resource elements 106 is constant over the duration of the subframe 104 appropriately placing the resource elements 108, 110 associated with non-user data, as has been described above.

FIG. 5 shows an embodiment of the LTE OFDMA based CBR subframe structure in accordance with another embodiment of the present invention assuming four antenna ports for different selected transmitter antenna ports. FIGS. 5A to D show the respective CBR subframes as used when transmitting on transmitter antenna port 1, 2, 3 and 4, respectively. In the embodiment of FIG. 5, the number of payload-data resource elements 106 in the subframe is constant over the frame length, i.e. for each symbol in the two slots of the subframe 104 a constant number or the same number of payload data resource elements 106 is provided. In the embodiment of FIG. 5, the resource elements 108 allocated to control information are provided in each of the symbols at the twelfth subcarrier. The reference signal resource elements 110 are evenly distributed over the subframe duration and in the frequency domain. Thus, except for symbol 6 in each slot of the subframe 104 the symbols include three resource elements 106 associated with non-payload data, e.g. control information resource elements 108 and reference signal resource elements 110 or control information reference elements 108 and unused resource elements 112. The symbol 6 in each slot of the subframe 104 does not include any reference signal resource elements 110 or unused resource elements 112 so that, to maintain the constant data rate, additional resource elements 108 are allocated to the control information. When compared to FIGS. 3 and 4 showing a symmetrical arrangement of the control information resource elements 108 with respect to the subcarriers, FIG. 5 shows another embodiment in which the control information resource elements 108 are placed asymmetrical with respect to the subcarriers.

In accordance with embodiments the control information resource elements 108 may be placed arbitrarily provided the number of payload data resource elements 106 remains constant over the subframe duration.

In accordance with the embodiments described above, assuming a static behavior of the radio channel within the duration of a subframe, the inventive subframe structure provides a constant data throughput of payload data or user data as it is, for example, desired for ULD services relying on such a constant throughput of data for an optimal performance.

In the following, in accordance with an embodiment, the modified mapping or placing resource elements allocated to reference signals or reference signal sequences will be described, when starting from a conventional subframe structure as described above with reference to FIG. 2. The mapping to resource elements or complex-valued modulation symbols $a_{k,l}^{(p)}$ transmitted on a port p of a reference-signal sequence $r_{l,n_s}(m)$ originally defined in [3GPP 36.211, Sec. 6.10.1], where $n_s$ is the slot number within a radio frame and l is the OFDM symbol number within the slot, is modified by introducing a shift $\theta_1$ to OFDM symbol l (marked with green color) to preserve the CBR as follows:

$$\tilde{a}_{k,l}^{(p)} = a_{k,l'}^{(p)} = r_{l',n_s}(m'),$$

where k defines an OFDM position in the frequency domain $$k = 6m + (v' + v_{shift}) \bmod 6,$$

and OFDM number in time domain is redefined as $$l' = l + \theta_1, \theta_1 = \begin{cases} 0 \text{ if } p = 0; \\ 1 \text{ if } p = \{1, 2\}, \\ 2 \text{ if } p = 3; \end{cases}$$

-continued $$l = \begin{cases} 0, N_{symb}^{DL} - 3 \text{ if } p \in \{0, 1\} \\ 1 \text{ if } p \in \{2, 3\} \end{cases}$$

$$m = 0, 1, \ldots, 2 * N_{RB}^{DL} - 1, m' = m + N_{RB}^{max,DL} - N_{RB}^{DL},$$

$$v' = \begin{cases} 0, \text{ if } p = 0 \text{ and } l = 0 \\ 3, \text{ if } p = 0 \text{ and } l \neq 0 \\ 3, \text{ if } p = 1 \text{ and } l = 0 \\ 0, \text{ if } p = 1 \text{ and } l \neq 0 \\ 3(n_s \bmod 2), \text{ if } p = 2 \\ 3 + 3(n_s \bmod 2), \text{ if } p = 3 \end{cases}$$

$$v_{shift} = N_{ID}^{cell} \bmod 6.$$

In the following, a further embodiment of the first aspect of the present invention is described. In conventional systems, for example systems using the LTE subframe having a length or duration of 1 ms, the receiver performs channel estimation based on the reference signals within the subframe, processes the control information of the first OFDM symbol or column of the subframe so as to specify whether resource elements have been assigned to the receiver or not. In case resource elements have been assigned to the receiver, the modulation and coding scheme (MCS) is signaled and eventually the receiver decodes the data included in the OFDM symbols for the PDSCH resource elements 106 (payload data resource elements). When considering a ULD service entailing a latency of, for example, below 1 ms, using the above described inventive subframe may not be sufficient, due to the distribution of the non-payload data over the duration of the subframe. The receiver waits for the whole subframe to be transmitted as only then the receiver has all symbols that may be processed in order to perform the channel estimation, to decode the control information and to eventually decode the data assigned to the receiver. Thus, the latency will still be more than 1 ms. In accordance with embodiments an instantaneous decoding of the transmitted user data is provided irrespective of the TTI length used for the data transmission. This is achieved by estimating and predicting the channel on the basis of previously received reference signals, and by using control data that has been pre-allocated and previously transmitted. For processing data received over a current TTI, reference signals and control data received during a previous subframe may be used. In accordance with embodiments also reference signals and control data received during TTIs of the current subframe may be used for processing data received over a current TTI. The reference signals and control data received during the current subframe may also include the reference signals and control data received during the current TTI. In accordance with this embodiment, the receiver, when receiving a current subframe, already has all of the information needed for instantaneous data processing without the need to wait for delivery of all reference signals and all control data in the current subframe, which takes at last 1 ms in conventional approaches. Since the information for the current frame is already present at the receiver prior to receiving the current frame, for example when considering a TTI length of one symbol, the receiver in the embodiment of FIG. 3 immediately starts decoding the payload data associated with the resource elements of symbol 0 in slot 0 of the subframe. It may also process the reference signals needed for channel estimation for a subsequent or following subframe.

Figure 6:
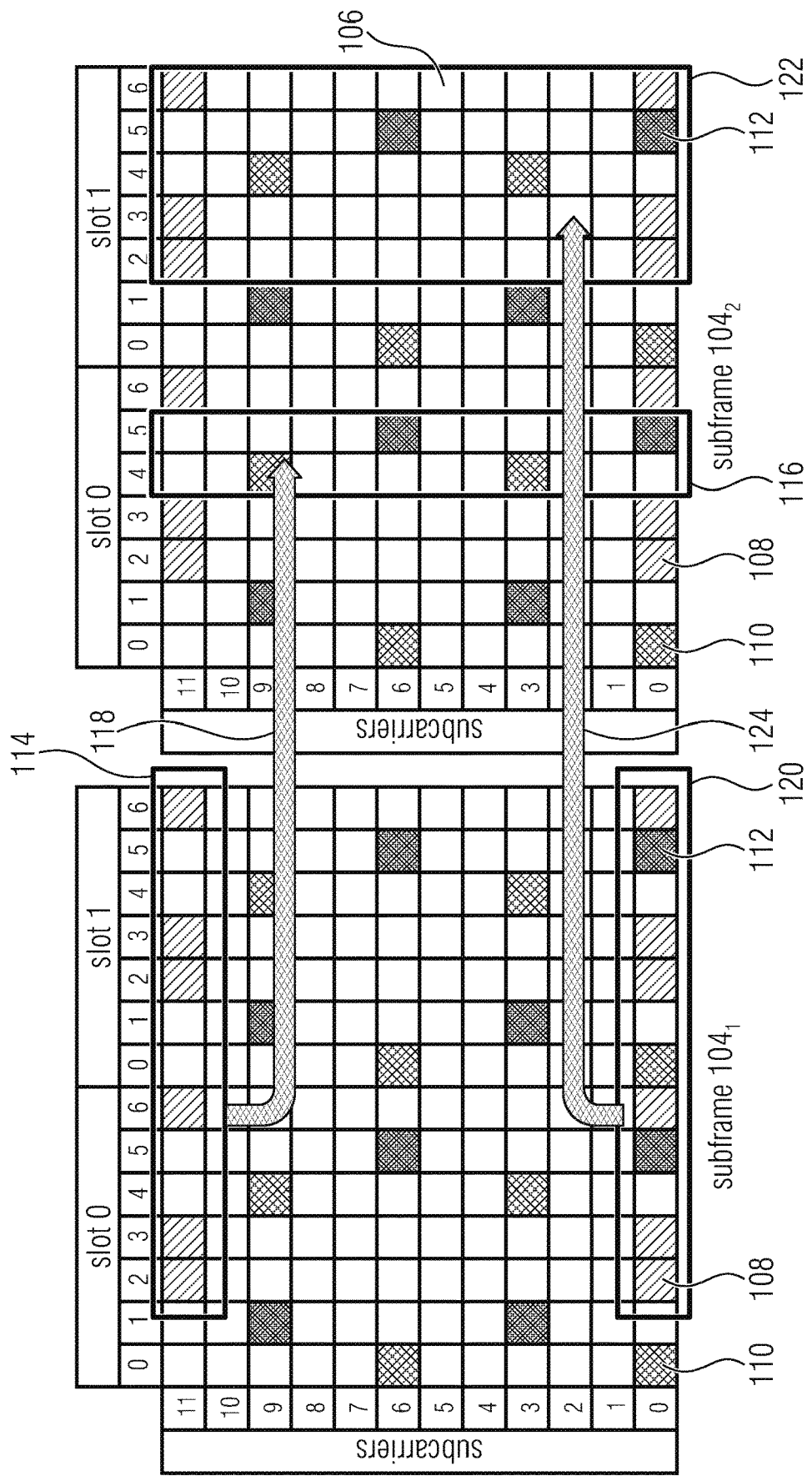
FIG. 6 shows a first LTE OFDMA based CBR subframe followed by a second consequent LTE OFDMA based CBR subframe having a subframe structures as shown in FIG. 4A, wherein the control information and the user data is decoupled in accordance with an embodiment of the present invention.

FIG. 6 shows a first LTE OFDMA based CBR subframe 104₁ followed by a second LTE OFDMA based CBR subframe 104₂. The subframes 104₁ and 104₂ have a subframe structure as shown in FIG. 4A, and the control information for determining whether data is assigned to the receiver and for eventually decoding the data is statically mapped to each subframe. The control information and the user data is decoupled in that the control information for the transmission in the second subframe is transmitted in the first subframe $104_1$, and PDSCH or payload data assigned to the receiver is transmitted in the second subframe $104_2$. In the embodiment shown in FIG. 6 it is assumed that for the receiver processing the subframes $104_1$, $104_2$ user data is present in the second subframe $104_2$ in the $4^{th}$ and $5^{th}$ symbols or OFDM columns of the first slot and in the $2^{nd}$ to $6^{th}$ symbols or OFDM columns of the second slot. The control information in the resource elements 114 in the first subframe $104_1$ associated with the $11^{th}$ subcarrier includes the control information for determining whether data (e.g. data in resource elements 116) is assigned to the receiver in the first slot of the second subframe $104_2$ and for eventually decoding the data, as is indicated by the arrow 118. Likewise, the control information in the resource elements 120 in the first subframe $104_1$ associated with the $0^{th}$ subcarrier includes the control information for determining whether data (e.g. data in resource elements 122) is assigned to the receiver in the second slot of the second subframe $104_2$ and for eventually decoding the data, as is indicated by the arrow 124. The payload data in other OFDM symbols or columns may be assigned to other receivers. In accordance with other embodiments, the control information 114, 120 of the first subframe $104_1$ may indicate other parts of the respective slots of the second subframe $104_2$ including user data. The control information associated with data in the current subframe (the second subframe $104_2$) is processed in an earlier subframe, e.g. the first subframe $104_1$, data in the second subframe $104_2$ may be processed immediately after receipt thereof after the reduced TTI of for example 1 TTI.

Figure 7:
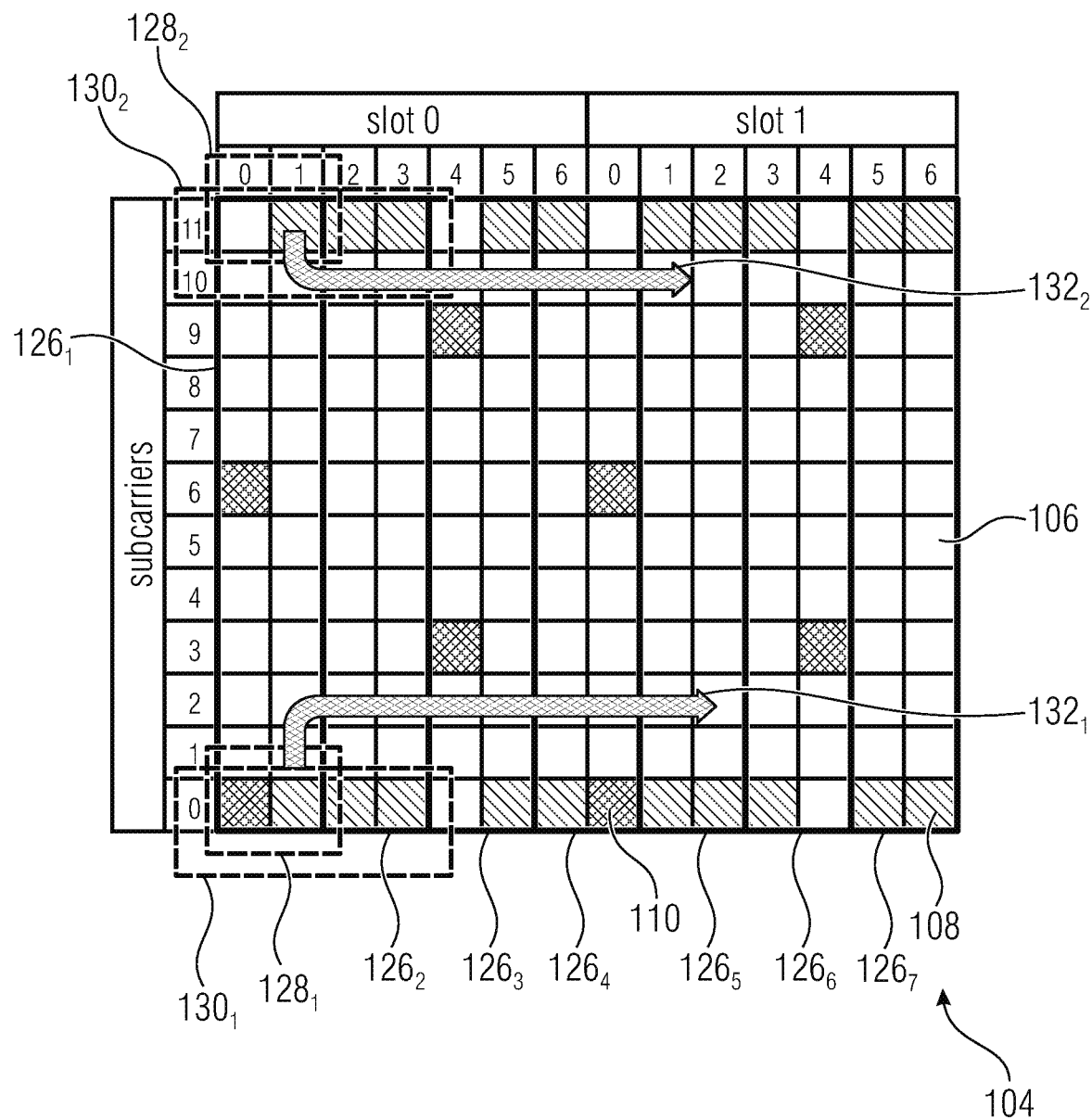
FIG. 7 shows a LTE OFDMA based CBR subframe having a subframe structure as shown in FIG. 3, wherein the control information and the user data is decoupled in accordance with another embodiment of the present invention.

FIG. 7 shows a LTE OFDMA based CBR subframe 104 having a subframe structure as shown in FIG. 3, and the control information for determining whether data is assigned to the receiver and for eventually decoding the data is dynamically mapped to a subframe. The TTI length is two OFDM symbols, as is indicated by the blocks $126_1$ to $126_7$, i.e. during each TTI the resource elements of one of the blocks $126_1$ to $126_7$ are transmitted to the receiver. The control information for determining whether data is assigned to the receiver and for eventually decoding the data is dynamically mapped to the current subframe 104. The control information and the user data is decoupled in that the control information is transmitted in a first part of the subframe 104 for PDSCH or payload data assigned to the receiver which is transmitted in second part of the subframe 104. The number of resource elements allocated to the control information may be provided dynamically, e.g. the control information may be provided in resource elements assigned to two OFDM symbols, see the small rectangles $128_1$, $128_2$, or four OFDM symbols, see the larger rectangles $130_1$, $130_2$. Instead of a fixed mapping of the control information to the subframe as in the embodiment of FIG. 6, in accordance with the embodiment of FIG. 7 the configuration is such that the number of OFDM symbols or columns used for the control information is signaled to the receiver. The number of OFDM symbols used for the control information may be equal to or may be different from the reduced TTI applied transmitting for the user data. The information what OFDM symbols are used for the control information may be given in the system information block (SIB) or in an RRC message. The receiver may search the control data by decoding the number of OFDM signals which are indicated via the above mentioned signaling and may eventually decode the resource elements allocated to PDSCH, the payload resource elements 106. In the embodiment of FIG. 7, the receiver derives from the signaled information that the control information is provided in the first reduced TTI $126_1$ or in the first and second reduced TTIs $126_1$, $126_2$. The control information in the resource elements $128_1$, $128_2$ or $130_1$, $130_2$ indicated that user data is assigned to the receiver and that the user data is provided in the fifth reduced TTI $126_5$, as is indicated by the arrows $132_1$, $132_2$. The payload data in other reduced TTIs may be assigned to other receivers.

In accordance with embodiments the first aspect of the present invention provides an approach in accordance with which reference signals may be evenly distributed over the duration of the resource block while preserving the spacing in time and frequency domains, and the remaining OFDM symbols associated with control information are balanced in the time domain, while interleaving them in the frequency domain, which allows for achieving a constant bit rate or constant data throughput. The channel may be estimated and predicted based on previously received pilot symbols, and the control data needed for decoding the payload data may be transmitted prior to the actual transmission.

Second Aspect—Different Frame/Subframe Structures

In accordance with a second aspect, frames or subframes of different format may be received at a receiver, e.g. a first frame or subframe having a structure in accordance with the LTE standard, and a second frame or subframe having a structure different form the LTE standard. In accordance with embodiments, the second frame/subframe may have a structure in accordance with the aspects described herein.

FIG. 8 shows embodiments of subframe structures different form the LTE structure that may be used in accordance with the second aspect of the present invention. Embodiments of radio subframes different to the LTE legacy case in terms of control data positions allocation are shown.

Figure 8A:
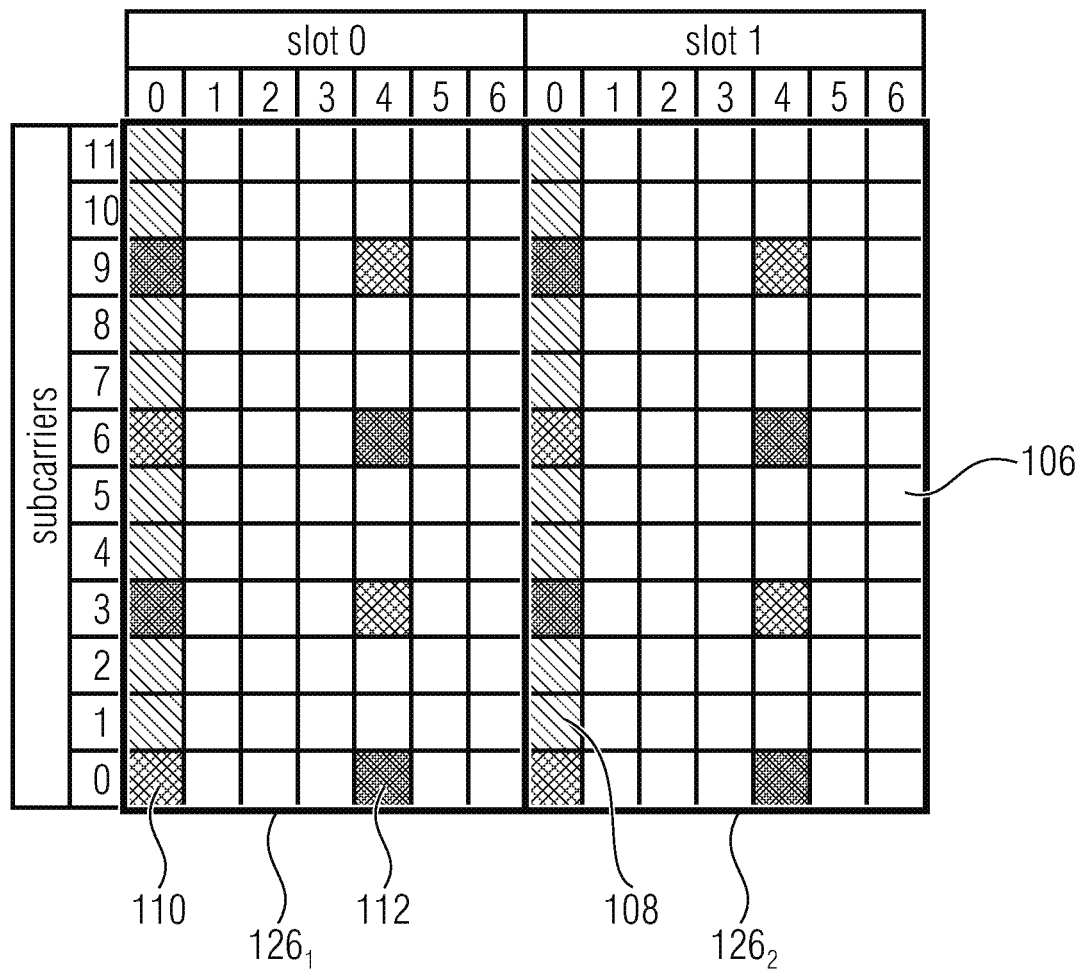
FIG. 8a-c shows embodiments of subframe structures different from the LTE structure that may be used in accordance with embodiments of the present invention.
Figure 8B:
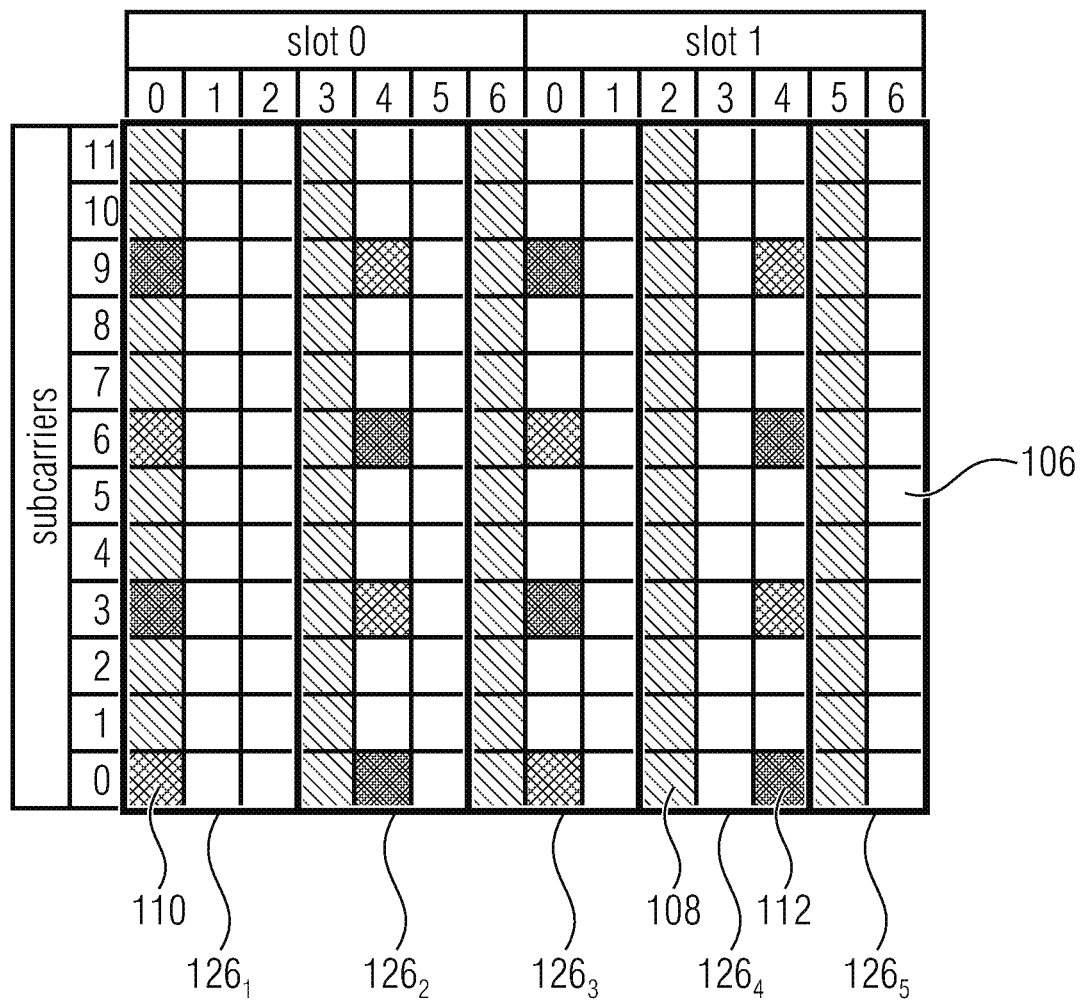

FIG. 8A shows a radio subframe structure with reduced TTI length, more specifically, with a static TTI length configuration having 7 OFDM symbols from left to right. The control data 108 is in the first OFDM column of the columns or blocks $126_1$-$126_2$ transmitted/received over one TTI length. FIG. 8B shows a radio subframe structure with reduced TTI length with a static TTI length configuration of 3 OFDM symbols from left to right. The control data 110 is in the first OFDM column of the columns or blocks $126_1$-$126_5$ transmitted/received over one TTI length. The subframe structures shown in FIG. 8A and in FIG. 8B are further embodiments for the LTE transmissions using a reduced TTI length (see the first and third aspects described herein) without the need of preallocation and transmission of the control data in previous subframes or prior to the reception of the current TTI.

Figure 8C:
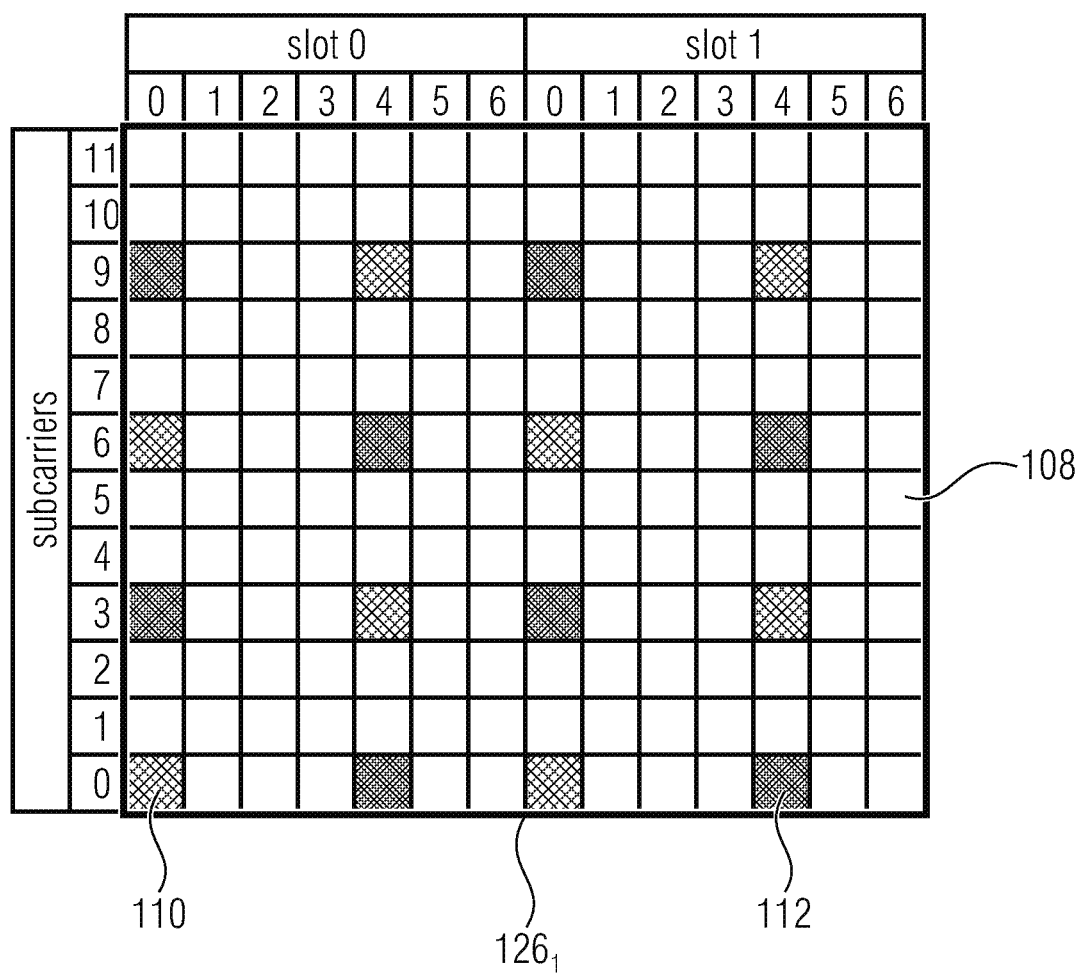

FIG. 8C shows a radio subframe structure in accordance with another embodiment having a TTI (see block $126_1$) of 14 symbols as defined for the legacy LTE frame but with no control data overhead. Only the references signals 110 are provided and all other available resource elements are allocated to payload data 106. This radio frame structure with no control overhead allows to achieve higher throughput that is beneficial for example for high bandwidth consuming applications.

The frames/subframes in accordance with the above described embodiments, in accordance with the second aspect, may be transmitted together with LTE frames/subframes, for example using carrier aggregation (see below).

Third Aspect—Signaling of Reduced TTI to the Receiver

In accordance with a third aspect of the present invention, the TTI is reduced to be shorter than the length of the subframe, for example the TTI may have a length of a single OFDM symbol or a plurality of OFDM symbols. The receiver starts processing the symbols of the data signal which are received over the shortened TTI. Thus, other than in conventional approaches where the receiver waits for 1 ms to start decoding the control information and eventually payload data, in accordance with the third aspect of the present invention, the receiver starts processing the received symbols early. For example, when considering the subframe shown in FIG. 2 and assuming a TTI of one OFDM symbol, the receiver starts processing the first symbol upon receipt thereof so that the control information is available once in the next TTI the payload data is received, so that processing of the data starts earlier when compared to conventional approaches. In accordance embodiments of the third aspect of the present invention, the reduced TTI or the number of symbols that is transmitted over one transmission interval is signaled to the receiver. Thus, by signaling the reduced TTI to the receiver, the receiver may start processing the received symbols early.

In accordance with an embodiment of the third aspect of the present invention, control information may be provided which describes the OFDM frame configuration, for example, the SIB. A static configuration of the LTE downlink frame or part of the LTE frame may be given, indicating that the subframe does not consist of a single TTI, but of a number of TT's, for example fourteen TTIs of one OFDM symbol length, and the number of OFDM symbols per TTI is indicated to the receiver, and the receiver may map the physical transport blocks (PTB) to the physical layers resources. The signaling may indicate that the complete bandwidth in the subframe, one or more frequency bands in the subframe or one or more resource blocks in the subframe are transmitted using reduced TTI. In accordance with embodiments, a time range may be indicated indicating which of the subframes of a frame of the data signal use the reduced TTI, for example by using the subframe index.

FIG. 9 shows an embodiment for implementing a signaling of the reduced TTI to a receiver in accordance with an embodiment of the present invention. FIG. 9A indicates a MIB 134 as it is used in conventional approaches, and FIG. 9B shows a modified MIB 136 including the additional information in accordance with the inventive approach. The modified MIB 136 includes an additional element termed "reduced_tti_config" 138 which signals to the receiver the number of TTIs within a subframe. The number of TTIs within a subframe may be signaled to be 1 (n1), which corresponds to the conventional approach, or it may be 2, 7 or 14 TTIs meaning that 2 OFDM symbols, 7 OFDM symbols or 14 OFDM symbols are transmitted per subframe, respectively. In the embodiment of FIG. 9, the signaling may be static at least for 4 whole LTE frames (40 ms), since the MIB is transmitted in the PBCH only once every frame in the subframe 0, and since the content will remain the same within 4 consecutive PBCH, the next change in signaling may occur after 40 ms.

FIG. 10 shows a further embodiment for a modified MIB 140 allowing the static configuration to be applied to a smaller part of the bandwidth of the system. As may be seen from a comparison of FIG. 10 and FIG. 9B, the MIB 140 further includes the entry "red_tti_bandwidth" 142, which indicates the resource blocks within four consequent LTE frames using a reduced TTI, for example to allow a start of an early processing of the symbols received.

In accordance with other embodiments, the signaling may also be included in the SIB instead of the MIB. In such a case, the receiver is informed that for some of the subframes or some of the resource blocks in the subframe a reduced TTI may be used. FIG. 11 shows an embodiment for yet another modified MIB 144 including the entry termed "reduced_tti_config_used" 146 which is a Boolean value indicating such a reduced TTI is used (TRUE) or not (FALSE). In case the use of a reduced TTI is indicated, the further information which of the RBs or which of the subframes actually uses the reduced TTI is given in the SIB.

In accordance with a further embodiment of the third aspect of the present invention, the reduced TTIs having the reduced number OFDM symbols (less symbols than the overall number of symbols in the subframe) may be used dynamically. For example the receiver may be configured dynamically to use at least in part of the resource blocks or subframes a reduced TTI. This configuration may be performed via an RRC message or using a modified DCI format which allows for the mapping to the changing TTI from subframe to subframe for a plurality of receivers in a communication system. The system configuration may indicate the granularity of the TTI size, i.e. the number of OFDM symbols that constitute the minimum TTI length, and the DCI format may indicate to the receiver the resource blocks or subframes having allocated thereto the TTI length with the minimum granularity value.

The signaling may be instantiated at the MIB or the SIB. Alternatively, RRC messages may be used to negotiate with the receivers, for example at random access or handover, i.e., during a configuration phase. The DCI format may be used to indicate each time which is the TTI length used at a given moment, and when considering an RRC connection setup message 148, as depicted in FIG. 12, the "late noncritical extension" 150 may be used to signal that the DCI format used contains information about the TTI length assignment and potentially about the modified subframe structure as described above with regard to the first aspect.

Figure 13A:
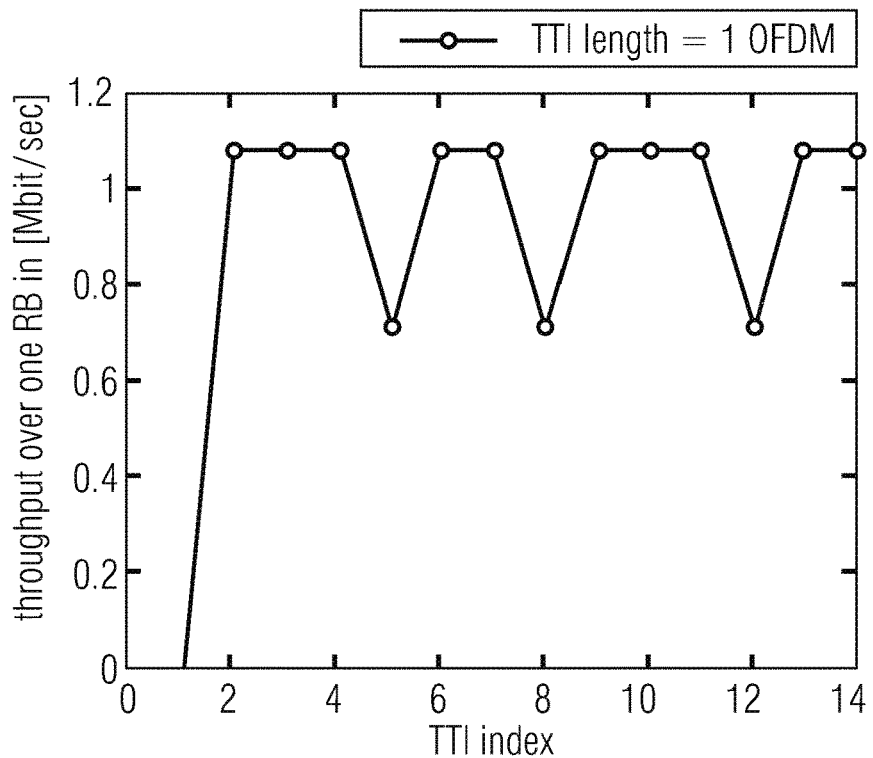
FIG. 13a-b shows the throughput over a RB versus the TTI index for TTI lengths of one OFDM symbol (FIG. 13A), and two OFDM symbols (FIG. 13B)
Figure 13B:
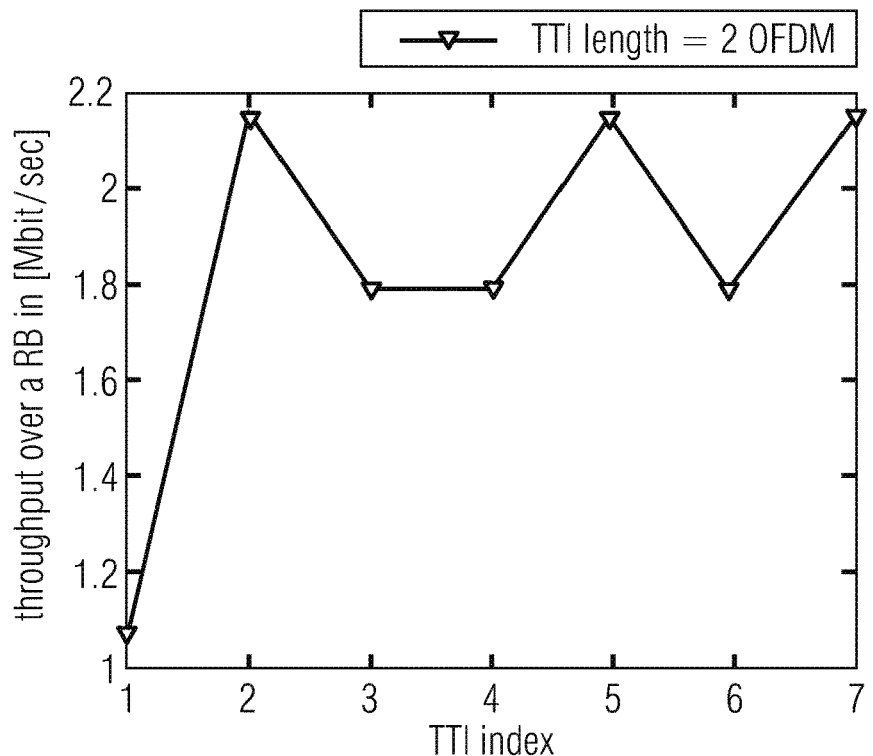

In accordance with the third aspect of the present invention, the subframe may consist of more than one TTI, which may result in a highly varying throughput for different TT's, with very different transport block sizes dependent on the TTI index. This is depicted in FIG. 13 showing the throughput over a resource block versus the TTI index for TTI lengths of one OFDM symbol (FIG. 13A), and two OFDM symbols (FIG. 13B). As may be seen from FIG. 13, while the approach in accordance with the third aspect, when not using the modified subframe format in accordance with the first aspect, may have a varying bit rate or varying data throughput, however, it allows for an earlier start of the data processing that, despite the varying throughput, reduces the end-to-end latency to below 1 ms as it may be desired for specific real time communication use cases.

Figure 14:
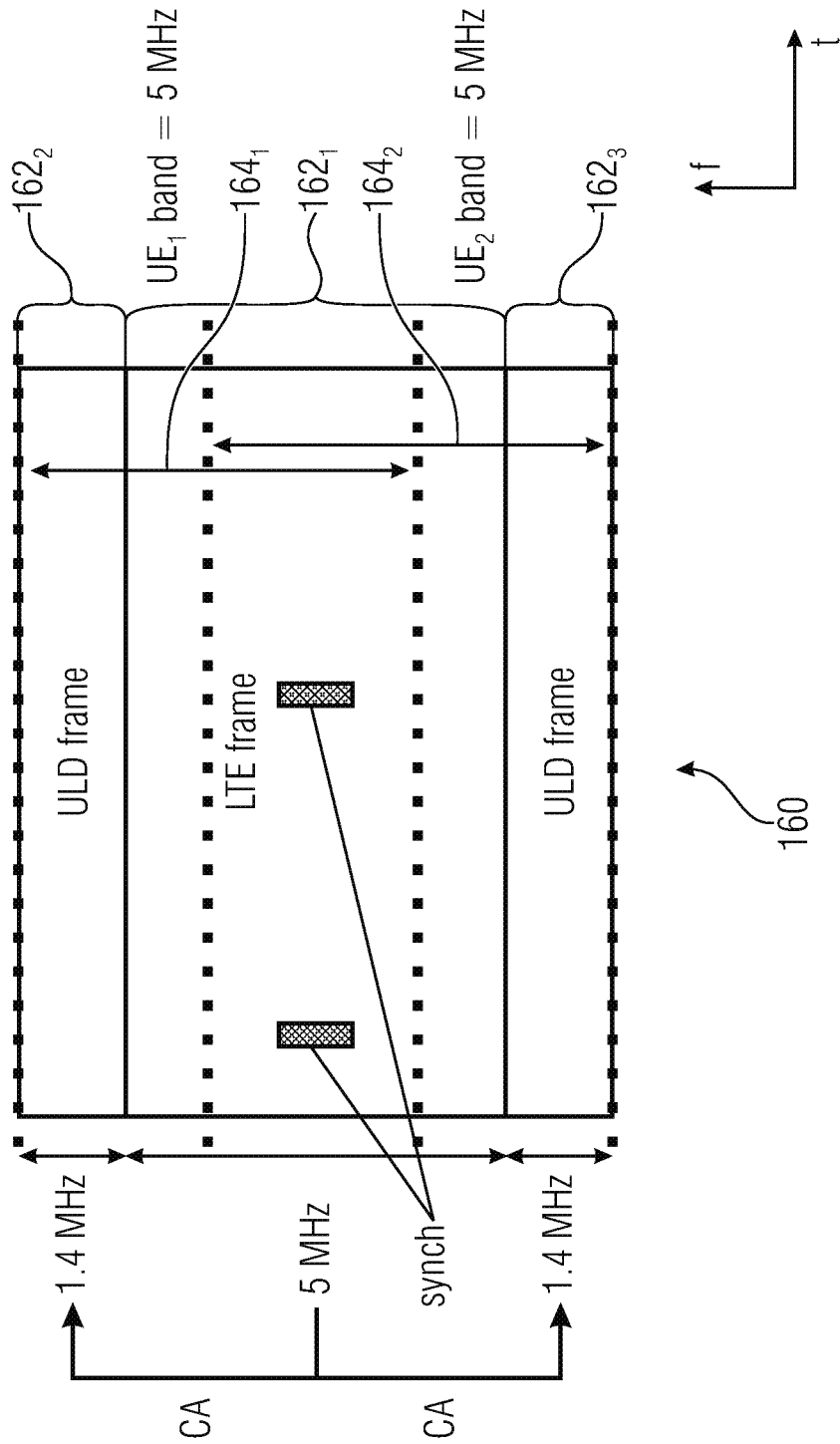
FIG. 14 is a schematic representation of the data signal using carrier aggregation for transmitting ULD frames.

In accordance with a further embodiments, which may be used together with the first, second and third aspects described above, Carrier Aggregation (CA) may be used to ensure backward compatibility. For example, the ULD frame structure may be used in another band, for example by using Carrier Aggregation (CA) so that backward compatibility is ensured. FIG. 14 is a schematic representation of the data signal using CA for transmitting ULD frames, which are implemented in accordance with the above described embodiments of the first and third aspects of the present invention, or for transmitting other frames different from the legacy LTE frame in accordance with the above described embodiments of the second aspect of the present invention. FIG. 14 schematically represents a frame 160 of the data signal using intra-band contiguous CA. The data signal includes three component carriers $162_1$, $162_2$ and $162_3$. The carrier component $162_1$ comprises a plurality of aggregated carriers spanning a first or primary frequency band of 5 MHz which may be used to transmit a conventional LTE frame in which the TTI is equal to the subframe length. In other embodiments, the LTE frame in the primary frequency band may be implemented in accordance with the above described embodiments of the first and second aspects of the present invention. In the embodiment depicted in FIG. 14, the carrier components $162_2$ and $162_3$ each comprises a plurality of aggregated carriers spanning a second frequency band of 1.4 MHz and a third frequency band of 1.4 MHz, which are contiguous with the primary frequency band and which may be used to transmit ULD frames implemented in accordance with the above described embodiments of the present invention.

In accordance with an embodiment, the UE or receiver may use the LTE frame as an access point to synchronize using and to discover where to find the band using the ULD frame structure.

In accordance with another embodiment, the UE or receiver may decode all bands so as to obtain ULD and non-ULD data.

In accordance with an embodiment, e.g. for a low-cost implementation, the two secondary bands are collocated (contiguous in frequency).

In accordance with an embodiment, to reuse existing components the bandwidth decoded by the UE may be a subset of the sum of two bands. For example, the bandwidth for a UE may be equal to the bandwidth of the primary band $162_1$ but a decoded band $164_1$, $164_2$ includes the carrier aggregated band $162_2$, $162_3$ and part of the primary band $162_1$, for example in a contiguous manner, so that a part of the primary band is skipped. A part of the primary band, where the synchronization signals are located, is maintained.

In accordance with embodiments, only one CA band or more CA bands may be attached to the primary band, and the UE may be signaled to decode the upper part of the whole bandwidth or the bottom part. This may be done dynamically depending, for instance, on the load.

The above embodiments have been described using intra-band contiguous carrier components, however, the present invention is not limited to this. In other embodiments, the carrier components may be intra-band non-contiguous or inter-band non-contiguous.

It is noted that the inventive signaling according to the third aspect may be used in combination with the above described first and second aspects to indicate to the user equipment which of the subframes or which of the resource blocks within the subframe includes the inventive subframe format, for example for implementing ULD services, or to indicate which part of the bandwidth of the radio frame is to be processed.

In accordance with yet another embodiment of the present invention, which may be used for the first, second and third aspects, the data transmission using the reduced TTI, either with or without the inventive subframe format, may be performed only in frequency bands, subframes or resource blocks in which no control information is given that is provided in predefined resource elements. For example, for the LTE downlink there are control channels that are transmitted at longer periods and take predefined central bandwidth positions in the frequency domain, for example the primary synchronization channel (PSCH) and the secondary synchronization channel (SSCH) are repeated every sixth subframe, and the physical broadcast channel (PBCH) is transmitted every first subframe in an LTE radio frame. A subframe in which control data is at predefined positions, for example to ensure backward compatibility, does not make use of the reduced TTI or the reduced TTI together with the inventive subframe format. In accordance with such embodiments only a subframe including control information that can be freely mapped or placed uses the reduces TTI and only for such a subframe the reduced TTI is signaled.

In accordance with another embodiment of the present invention, which may be used for the first, second and third aspects, the symbols in the data signal block to be transmitted/received over different transmission intervals may be associated with different receivers. For example, in the embodiment of FIG. 7, the TTI length is two OFDM symbols, as is indicated by the blocks $126_1$ to $126_7$, i.e. during each TTI the resource elements of one of the blocks $126_1$ to $126_7$ are transmitted to the receiver, and the resource elements in all blocks or in some of the blocks may be associated with different UEs or receivers.

Figure 15:
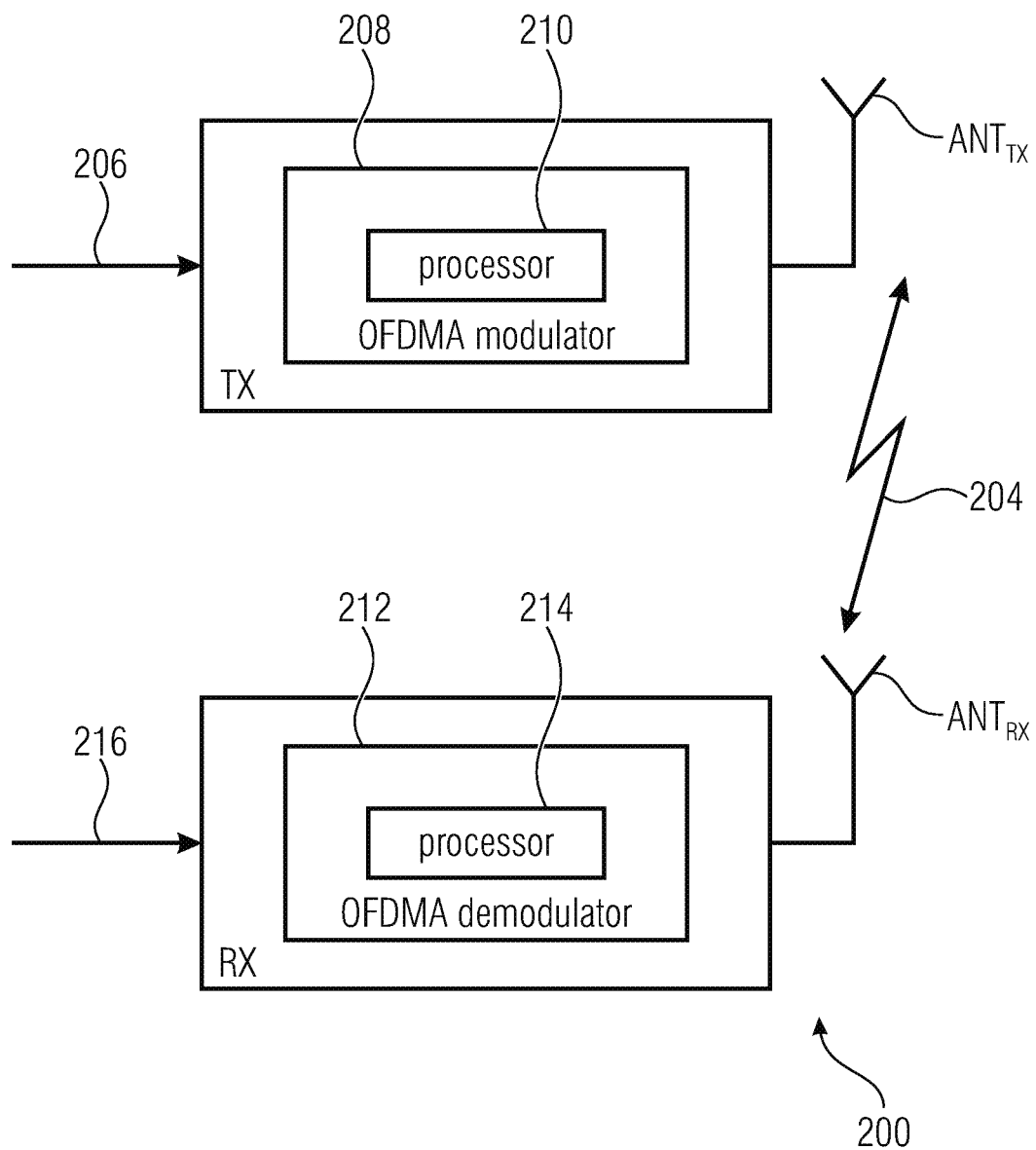
FIG. 15 is a schematic representation of a wireless communication system for transmitting information from a transmitter to a receiver.

In accordance with embodiments of the present invention, the first, second and third aspects may be implemented in a wireless communication system as depicted in FIG. 1 including a transmitter, like a base station, and a receiver, like a mobile terminal. FIG. 15 is a schematic representation of a wireless communication system 200 for transmitting information from a transmitter TX to a receiver RX. The transmitter TX includes an antenna $ANT_{TX}$ and the receiver RX includes an antenna $ANT_{RX}$, and as is indicated by the arrow 204 signals are transmitted from the transmitter TX to the receiver RX via a wireless communication link, like a radio link. The transmission may be in accordance with the OFDMA communication approach, and the above referenced transmission time interval indicates the time period of a radio transmission from the transmitter TX to the receiver RX. The transmitter TX comprises an input 206 for receiving data to be transmitted to the receiver RX. The input data 206 is received at an OFDMA modulator 208 comprising a signal processor 210 for processing the received signals 206 to generate a data signal to be transmitted to the receiver RX. The signaling between the transmitter TX and RX is in accordance with the above described first, second and third aspects of the present invention, i.e. the transmitter may include the OFDMA modulator operating in such a way that the inventive subframe format for a constant data throughput is chosen for one or more subframes or resource blocks to be transmitted to the receiver RX, and/or the use of a reduced TTI for one or more subframes or RBs in the signal transmitted to the receiver RX is indicated to the receiver in a way as described above. The receiver RX receives via the antenna the signal from the transmitter TX and applies the signal to the OFDMA demodulator 212 including a signal processor 214 for processing the received signal to generate the output signal 216.

Figure 16:
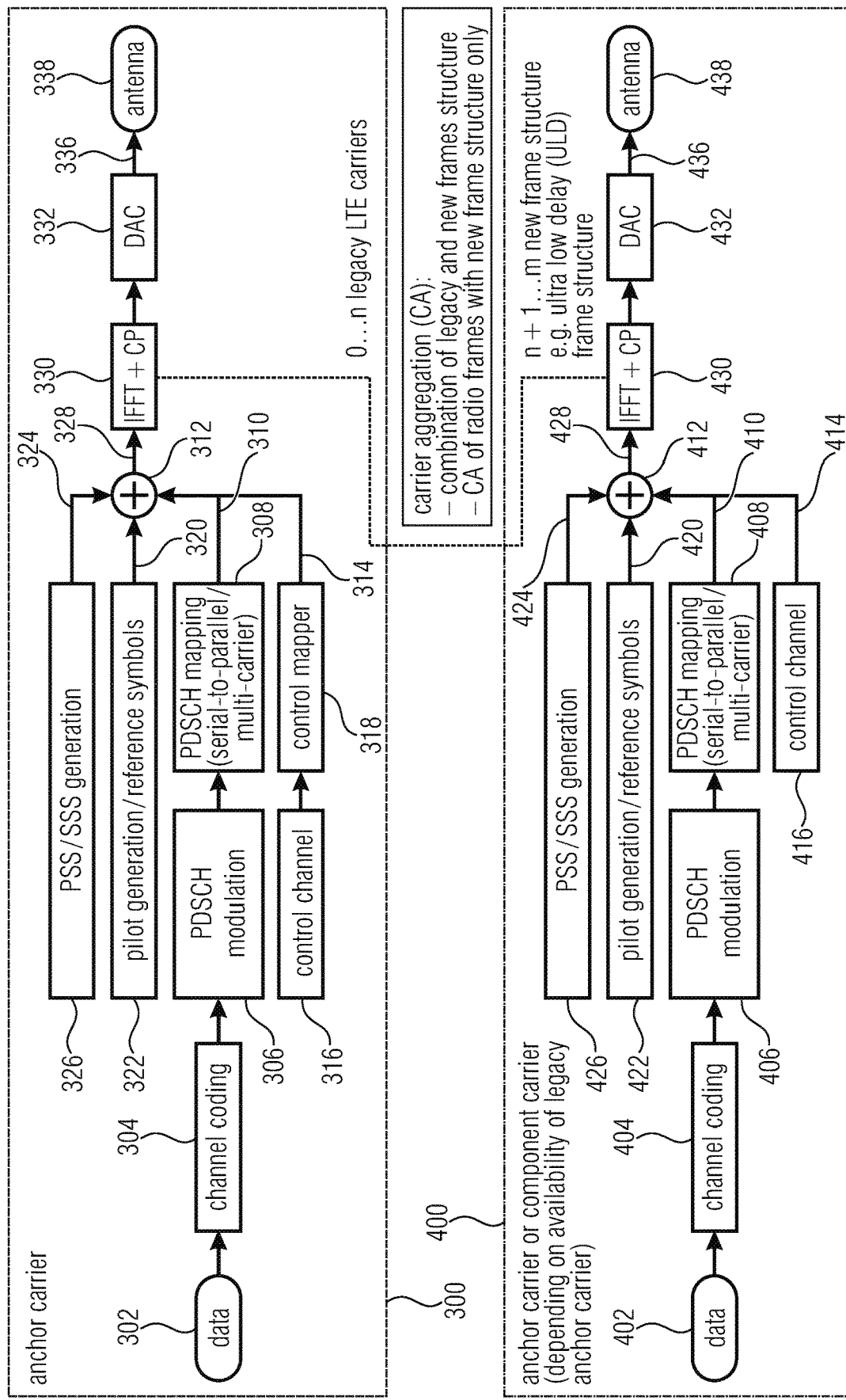
FIG. 16 is a schematic representation of transmitters in a wireless communication system for transmitting data or information to a receiver in accordance with embodiments.

FIG. 16 is a block diagram of a first transmitter 300 in a wireless communication system for transmitting information to a receiver in accordance with embodiments described above. The transmitter 300 receives data 302 that is encoded by the channel encoder 304, modulated by the modulator 306 and mapped to the multiple carriers by the mapper 308. The signal 310 is combined at 312 with control signals 314 provided by the control channel unit 316 and the control mapper 318, with pilot symbols 320 from the pilot symbol generator 322, and with PSS/SSS signals 324 from the PSS/SSS signal generator 326. The combined signal 328 is provided to the IFFT+CP block 330, is converted by the DAC 332 into the analog domain. The analog signal 336 is processed for radio transmission and eventually transmitted by the antenna 338. In accordance with embodiments, the inventive aspects may be implemented using the mappers 308 and 318 for mapping the control and data elements in accordance with the embodiments described above. For the signaling, for example, the control channel unit 316 may be used to provide the additional information about the reduced TTI.

When using the CA approach described above, the additional transmitter 400 may be provided together with the transmitter 300 so as to provide together with the transmitter the additional frame, e.g. different from the legacy LTE frame, for a receiver. The structure of the transmitter 400 is substantially the same as for the transmitter 300 and corresponding blocks are indicated by corresponding reference signals. The transmitter 400 provides the additional frame using a component in accordance with CA.

In the following additional embodiments are described. A $1^{st}$ embodiment provides a receiver, wherein the receiver is configured to receive a data signal, the data signal comprising at least one data signal block, the data signal block having a predefined duration in the time domain, a number of symbols in the time domain and a bandwidth in the frequency domain, wherein the data signal block is received over a plurality of transmission intervals, wherein a length of one transmission interval is shorter than the duration of the data signal block so that a subset of the symbols of the data signal block is received over one transmission interval, and wherein the receiver comprises a signal processing device configured to process the symbols of the data signal block which have been received over one transmission interval.

A $2^{nd}$ embodiment provides the receiver of the $1^{st}$ embodiment, wherein the receiver is configured to receive information indicating to the receiver the number of symbols received over one transmission interval.

A $3^{rd}$ embodiment provides the receiver of the $2^{nd}$ embodiment, wherein the number of symbols received over one transmission interval is indicated for the whole bandwidth of the data signal block, or for one or more portions of the bandwidth of the data signal block.

A $4^{th}$ embodiment provides the receiver of the $2^{nd}$ or $3^{rd}$ embodiment, wherein the data signal comprises a plurality of data signal blocks, and wherein the number of symbols received over one transmission interval is indicated for one, more or each of the data signal blocks.

A $5^{th}$ embodiment provides the receiver of one of the $2^{nd}$ to $4^{th}$ embodiments, wherein the data signal block comprises control data and payload data, and wherein the information indicating to the receiver the number of symbols received over one transmission interval is included in the control data of the data signal block.

A $6^{th}$ embodiment provides the receiver of one of the $1^{st}$ to $5^{th}$ embodiments, wherein the data signal comprises a plurality of data signal blocks, wherein the plurality of data signal blocks comprises one or more data signal blocks including control data at predefined resource elements, and data of a data signal block including the control data at the predefined resource elements is received with a transmission interval equal to the duration of the data signal blocks.

A $7^{th}$ embodiment provides the receiver of one of the $1^{st}$ to $6^{th}$ embodiments, wherein a symbol and a frequency define a resource element of the data signal block; the data signal block comprises control data and payload data, and the control data is mapped to the resource elements of the data signal block such that for each symbol the number resource elements to which payload data is mapped is the constant.

An $8^{th}$ embodiment provides the receiver of one of the $1^{st}$ to $7^{th}$ embodiments, wherein the bandwidth of the data signal block comprises a first frequency band and a second frequency band, and wherein the data signal block is received over a plurality of transmission intervals in at least one of the first and second frequency bands.

A $9^{th}$ embodiment provides the receiver of the $8^{th}$ embodiment, wherein the bandwidth of the data signal block comprises at least one further frequency band in which the data signal block is received over a plurality of transmission intervals.

A $10^{th}$ embodiment provides the receiver of the $8^{th}$ or $9^{th}$ embodiment, wherein the signal processing device is configured to decode data from a frequency band comprising a part of the first frequency band and the second frequency band, wherein the bandwidth of the decoded frequency band is the bandwidth of the first frequency band.

An $11^{th}$ embodiment provides the receiver of the $10^{th}$ embodiment, wherein the part of the first frequency band comprises physical signals to synchronize the receiver to a radio network.

A $12^{th}$ embodiment provides the receiver of one of the $8^{th}$ to $11^{th}$ embodiments, wherein the first frequency band is a first carrier component of a carrier aggregation, and the second frequency band is a second carrier component of the carrier aggregation, and wherein the carrier components are intra-band contiguous, intra-band non-contiguous or inter-band non-contiguous.

A $13^{th}$ embodiment provides the receiver of one of the $1^{st}$ to $12^{th}$ embodiments, wherein the symbols of the data signal block received over different transmission intervals are associated with different receivers.

A $14^{th}$ embodiment provides the receiver of one of $1^{st}$ to $13^{th}$ embodiments, wherein the receiver is a mobile terminal in an OFDMA wireless communication system, and the data signal is an OFDM signal provided by a transmitter in the wireless communication system, the OFDM signal having a plurality of frames, the frame including a plurality of sub-frames, wherein the data signal block is a sub-frame of the OFDM signal, wherein the transmission interval is the transmission time interval, and wherein the sub-frame comprises a plurality of transmission time intervals.

A $15^{th}$ embodiment provides a transmitter, wherein the transmitter is configured to transmit a data signal, the data signal comprising at least one data signal block, the data signal block having a predefined duration in the time domain, a number of symbols in the time domain and a bandwidth in the frequency domain, wherein the data signal block is transmitted over a plurality of transmission intervals, wherein a length of one transmission interval is shorter than the duration of the data signal block so that a subset of the symbols of the data signal block is transmitted over one transmission interval, and wherein the transmitter is configured to transmit information indicating to a receiver the number of symbols received over one transmission interval so as to allow the receiver to process the symbols of the data signal block which have been received over one transmission interval.

A $16^{th}$ embodiment provides a wireless communication system, comprising a receiver of one of the $1^{st}$ to $14^{th}$ embodiments; and a transmitter of the $15^{th}$ embodiment.

A $19^{th}$ embodiment provides a method, comprising receiving, at a receiver, a data signal, the data signal comprising at least one data signal block, the data signal block having a predefined duration in the time domain, a number of symbols in the time domain and a bandwidth in the frequency domain, wherein the data signal block is received over a plurality of transmission intervals, wherein a length of one transmission interval is shorter than the duration of the data signal block so that a subset of the symbols of the data signal block is received over one transmission interval; and processing, by the receiver, the symbols of the data signal block which have been received over one transmission interval.

A 20$^{th}$ embodiment provides a method, comprising transmitting, by a transmitter, a data signal, the data signal comprising at least one data signal block, the data signal block having a predefined duration in the time domain, a number of symbols in the time domain and a bandwidth in the frequency domain, wherein the data signal block is transmitted over a plurality of transmission intervals, wherein a length of one transmission interval is shorter than the duration of the data signal block so that a subset of the symbols of the data signal block is transmitted over one transmission interval; and transmitting, by the transmitter, information indicating to a receiver the number of symbols received over one transmission interval so as to allow the receiver to process the symbols of the data signal block which have been received over one transmission interval.

A 21$^{th}$ embodiment provides a method, comprising transmitting, by a transmitter of a wireless communication device, a data signal, the data signal comprising at least one data signal block, the data signal block having a predefined duration in the time domain, a number of symbols in the time domain and a bandwidth in the frequency domain, wherein the data signal block is transmitted over a plurality of transmission intervals, wherein a length of one transmission interval is shorter than the duration of the data signal block so that a subset of the symbols of the data signal block is transmitted over one transmission interval; transmitting, by the transmitter, information indicating the number of symbols received over one transmission interval; receiving, at a mobile terminal of the wireless communication system, the data signal and the information indicating the number of symbols received over one transmission interval; and processing, by the mobile terminal, the symbols of the data signal block which have been received over one transmission interval.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Depending on certain implementation requirements, embodiments of the invention can be implemented in hardware or in software. The implementation can be performed using a digital storage medium, for example a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A receiver,
    wherein the receiver is configured to receive a data signal, the data signal comprising a plurality of frames, the plurality of frames comprising at least a first frame received in one frequency band and a second frame received in another frequency band, wherein the first frame is different from a legacy LTE frame and the second frame is different from a legacy LTE frame,
    wherein the first frame comprises a first format with a predefined duration in the time domain, a number of symbols in the time domain and a bandwidth in the frequency domain,
    wherein the second frame comprises a second format with a predefined duration in the time domain, a number of symbols in the time domain and a bandwidth in the frequency domain, the first format and the second format being different,
    wherein the receiver comprises a signal processing device configured to process the symbols of the frames comprising the first format and the second format, wherein the receiver is configured to use the first frame as an access point to synchronize and to discover where to find the other frequency band for the second frame, and wherein, responsive to a signaling that indicates that the other frequency band for the second frame is to be processed, the receiver is configured to not process the frequency band for the first frame and to decode the other frequency band for the second frame.

2. The receiver of claim 1, wherein the first frame is a frame of a first type, and the second frame is a frame of a second type different from the first type.

3. The receiver of claim 2, wherein the first frame is a non-ULD frame, and the second frame is a ULD frame.

4. The receiver of claim 1, wherein the first and second frames are received by using Carrier Aggregation.

5. The receiver of claim 1, wherein the receiver is configured to receive the first frame from a first transmitter and the second frame from a second transmitter.

6. The receiver of claim 1, wherein the second frame is received over a plurality of transmission intervals, wherein a length of one transmission interval is shorter than the duration of the second frame so that a subset of the symbols of the second frame is received over one transmission interval, and wherein the signal processing device is configured to process the symbols of the second frame which have been received over one transmission interval.

7. The receiver of claim 1, wherein
the bandwidth of the data signal comprises a first frequency band and a second frequency band, and
wherein the either the first frame or the second frame is received over a plurality of transmission intervals in the first frequency band or in the second frequency band.

8. The receiver of claim 7, wherein the first frequency band is a first carrier component of a carrier aggregation, and the second frequency band is a second carrier component of the carrier aggregation, and wherein the carrier components are intra-band contiguous, intra-band non-contiguous or inter-band non-contiguous.

9. The receiver of claim 1, wherein the bandwidth of the data signal comprises at least one further frequency band.

10. The receiver of claim 1, wherein the signal processing device is configured to decode data from a frequency band comprising a part of the first frequency band and the second frequency band, wherein the bandwidth of the decoded frequency band is the bandwidth of the first frequency band.

11. A transmitter,
wherein the transmitter is configured to transmit a data signal, the data signal comprising a plurality of frames, the plurality of frames comprising at least a first frame transmitted in one frequency band and a second frame transmitted in another frequency band, wherein the first frame is different from a legacy LTE frame and the second frame is different from a legacy LTE frame,
wherein the first frame comprises a first format with a predefined duration in the time domain, a number of symbols in the time domain and a bandwidth in the frequency domain,
wherein the second frame comprises a second format with a predefined duration in the time domain, a number of symbols in the time domain and a bandwidth in the frequency domain, the first format and the second format being different at least in terms of the duration in the time domain or the bandwidth in the frequency domain,
wherein a receiver is to use the first frame as an access point to synchronize and to discover where to find the other frequency band for the second frame, and
wherein, responsive to a signaling that indicates that the other frequency band for the second frame is to be processed, the receiver is to not process the frequency band for the first frame and to decode the other frequency band for the second frame.

12. A method, comprising:
receiving, at a receiver, a data signal, the data signal comprising a plurality of frames, the plurality of frames comprising at least a first frame received in one frequency band and a second frame received in another frequency band, wherein the first frame is different from a legacy LTE frame and the second frame is different from a legacy LTE frame,
wherein the first frame comprises a first format with a predefined duration in the time domain, a number of symbols in the time domain and a bandwidth in the frequency domain, and
wherein the second frame comprises a second format with a predefined duration in the time domain, a number of symbols in the time domain and a bandwidth in the frequency domain, the first format and the second format being different at least in terms of the duration in the time domain or the bandwidth in the frequency domain; and
processing, by the receiver, the symbols of the frames comprising the first format and the second format,
wherein the first frame is used by the receiver as an access point to synchronize and to discover where to find the other frequency band for the second frame, and
wherein, responsive to a signaling that indicates that the other frequency band for the second frame is to be processed, the receiver does not process the frequency band for the first frame and to decode the other frequency band for the second frame.

* * * * *